(12) United States Patent
Farris et al.

(10) Patent No.: US 9,554,435 B2
(45) Date of Patent: Jan. 24, 2017

(54) LED DRIVE APPARATUS, SYSTEMS AND METHODS

(71) Applicant: TEXAS INSTRUMENTS INCORPORATED, Dallas, TX (US)

(72) Inventors: Jeffrey Scott Farris, Flower Mound, TX (US); Michael David McCormick, Allen, TX (US); Jason Ryan Thompson, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 610 days.

(21) Appl. No.: 14/030,746

(22) Filed: Sep. 18, 2013

(65) Prior Publication Data

US 2014/0085731 A1   Mar. 27, 2014

Related U.S. Application Data

(60) Provisional application No. 61/704,131, filed on Sep. 21, 2012.

(51) Int. Cl.
*H05B 33/08* (2006.01)
*G02B 27/01* (2006.01)

(52) U.S. Cl.
CPC .......... *H05B 33/0827* (2013.01); *G02B 27/01* (2013.01); *H05B 33/0818* (2013.01); *Y10T 307/625* (2015.04)

(58) Field of Classification Search
CPC ............ H05B 33/0818; H05B 33/0869; H05B 33/0827; H05B 33/0815
USPC ........................................................ 316/192
See application file for complete search history.

(56) References Cited

U.S. PATENT DOCUMENTS

| | | | | |
|---|---|---|---|---|
| 6,441,558 | B1* | 8/2002 | Muthu | .............. H05B 33/0863 315/118 |
| 6,495,964 | B1* | 12/2002 | Muthu | ..................... F21V 9/10 250/214 AL |
| 6,987,787 | B1 | 1/2006 | Mick | |
| 7,276,861 | B1* | 10/2007 | Shteynberg | .......... H02M 3/157 315/224 |
| 7,315,139 | B1* | 1/2008 | Selvan | ................. H05B 33/086 250/205 |
| 8,159,150 | B2* | 4/2012 | Ashdown | .......... H05B 33/0818 315/149 |

(Continued)

*Primary Examiner* — Don Le
(74) *Attorney, Agent, or Firm* — Michael A. Davis, Jr.; Charles A. Brill; Frank D. Cimino

(57) ABSTRACT

Light flux levels sensed from a color LED array control both current availability to the array and disable/re-enable a current bypass switch to shunt stored-energy current to or away from a selected LED. In continuous mode, a single flux pulse is created for the duration of a pre-established period. Feedback from the flux sensor pulses current to an energy storage device to maintain the light flux at a predetermined set-point. A particular dimming level is achieved by establishing both the pulse period and the flux magnitude. In discontinuous mode, one or more short flux pulses are created. Both the turn-on and the turn-off time of each flux pulse is controlled by alternately removing and then re-establishing a current shunt from the energy storage device to ground. Flux pulse magnitude is controlled by recognizing when the flux pulse has reached a predetermined set-point and re-establishing the current shunt to abruptly turn off current to the selected LED.

12 Claims, 18 Drawing Sheets

(56) References Cited

U.S. PATENT DOCUMENTS

| | | | |
|---|---|---|---|
| 8,339,058 B2* | 12/2012 | Simmers | H05B 33/086 |
| | | | 315/152 |
| 8,339,068 B2 | 12/2012 | Simmers | |
| 8,749,172 B2* | 6/2014 | Knapp | H05B 33/0869 |
| | | | 315/185 R |
| 2006/0245174 A1* | 11/2006 | Ashdown | H05B 33/0818 |
| | | | 362/85 |
| 2011/0309754 A1* | 12/2011 | Ashdown | H05B 33/0869 |
| | | | 315/151 |
| 2014/0091724 A1* | 4/2014 | Palmer | H02M 3/1582 |
| | | | 315/201 |

* cited by examiner

LED DRIVE APPARATUS, SYSTEMS AND METHODS

PRIORITY CLAIM

This application claims the benefit of priority under 35 U.S.C. §119(e) to U.S. Provisional Patent Application Ser. No. 61/704,131 titled "LED Drive Method and Apparatus," filed on Sep. 21, 2012 and incorporated herein by reference in its entirety.

TECHNICAL FIELD

Structures and methods described herein relate to light-emitting diodes (LEDs), including LED luminance control suitable for high dynamic range ambient light environments.

BACKGROUND INFORMATION

Automotive LED application designs, such as LED illuminated micro-display console systems and Head-up Display (HUD) systems, face challenging requirements. These include extended operating temperature range, very wide dimming ratio (ratio of fullest brightness image for full sunlight to lowest brightness image for night darkness), and very tight/high quality color point control requirements.

Typical solutions use LED current as the primary feedback mechanism. Some solutions perform dimming by decreasing either amplitude or duration of current through one or more LEDs.

Texas Instruments DLP® DMD projection technology is a mature technology widely used in numerous display applications, hand held projectors, conference rooms, and digital theaters.

SUMMARY OF THE INVENTION

Figure 1:
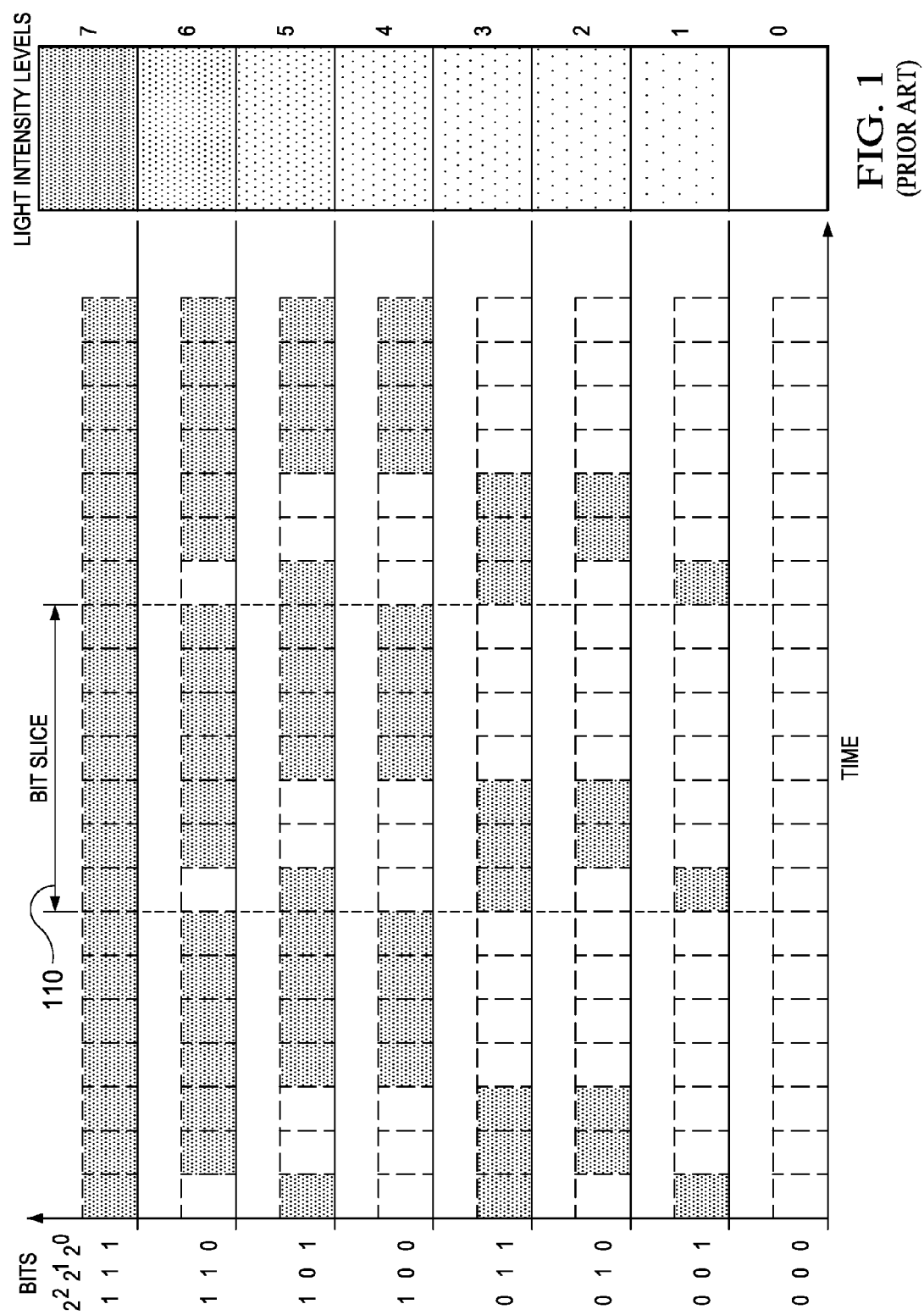
FIG. 1 is a prior-art diagram illustrating luminance control of a single LED using a three-bit binary word to "bit-weight" a stream of LED drive current pulses.

Apparatus, systems and methods disclosed herein implement dynamic dimming of a color LED array such as may be used in various applications operating in high dynamic range ambient light conditions. Such applications may include projection systems of various types including HUD systems, color display panels, outdoor signage, etc.

Embodiments herein may operate in one or both of two modes, "continuous mode" (CM) and "discontinuous mode" (DM). Lower dimming ratios are available in CM and higher dimming ratios are available in DM. Consequently, a device or system operating in an extremely wide dynamic range of ambient light may transition back and forth between CM operation during periods of high ambient light and DM operation during periods of low ambient light. Methods and structures herein do not so require, however, as each mode of operation is distinctly supported.

Both modes of operation use light flux levels sensed from the color LED array as a feedback signal. The light flux feedback signal is used to control both current availability to the LED array and the state of a current bypass switch. The current bypass switch is capable of quickly shunting stored-energy current to or away from a selected LED. In both modes of operation, a target flux level is selected as is a time period referred to herein as a "bit-slice" period. One or more single primary color LEDs are selected from the array for operation during a single bit-slice period. For example, for an array with a single LED per additive primary color, only a single red, green, or blue LED would be selected for operation during a bit-slice period.

In CM operation, a single flux pulse is created for the duration of the bit-slice period. Feedback from the light flux sensor is used to pulse current to an energy storage device used to supply current to the selected LED such as to maintain the output light flux at a predetermined level or set-point during the bit-slice period. A particular dimming level is achieved by establishing both the bit-slice period length and the flux magnitude set-point. Dimming ratios on the order of 1:32 are achievable in CM operation, with the limiting factor being unevenness of tracking between LED current and flux output at low levels of LED current.

In DM operation, one or more short flux pulses are created during the bit-slice period. Both the turn-on and the turn-off times of each such DM flux pulse are controlled by alternately removing and then re-establishing a current shunt from the energy storage device to ground. Flux pulse magnitude is controlled by recognizing when the sensed flux pulse magnitude has reached a predetermined set-point. A resulting flux compare signal is used to re-establish the current shunt and to thus abruptly turn off current to the selected LED. A flux pulse of precise amplitude with a sharply falling edge results. Very high dimming ratios on the order of 1:4000 or more are achievable in DM operation.

An example automotive and/or aircraft HUD system embodiment is also described and claimed. In some embodiments, the example HUD system utilizes Texas Instruments DLP® DMD projection technology in conjunction with the CM and DM dimming apparatus and methods described in detail below.

DETAILED DESCRIPTION

FIG. 1 is a prior-art diagram illustrating luminance control of a single LED using a three-bit binary word to "bit-weight" a stream of LED drive current pulses. That is, the size of the binary control word determines the average number of current pulses per time applied to the LED. And, the resulting intensity of light emanating from the LED is a function of the average number of current pulses per time. The term "bit-slice" as used herein shall mean a period of time (e.g., the period of time 110) during which one or more pulses of current are applied to an LED.

Figure 2A:
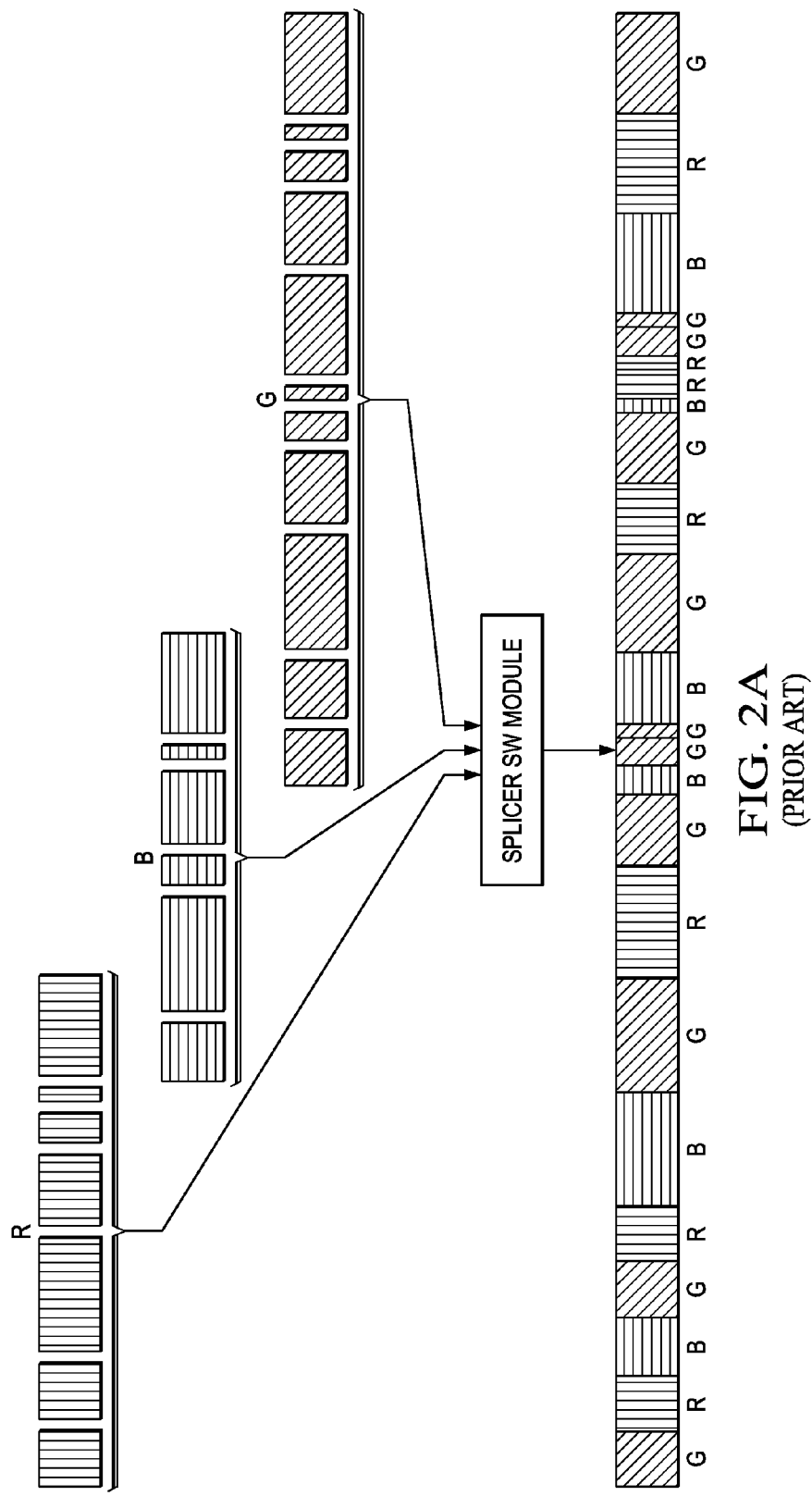
FIG. 2A is a prior-art diagram illustrating a stream of LED drive current pulses created by combining multiple, differently bit-weighted sub-streams of LED drive current pulses, each sub-stream corresponding to a particular primary color.

FIG. 2A is a prior-art diagram illustrating a stream of LED drive current pulses created by combining multiple, differently bit-weighted sub-streams of LED drive current pulses, each sub-stream corresponding to a particular primary color.

Figure 2B:
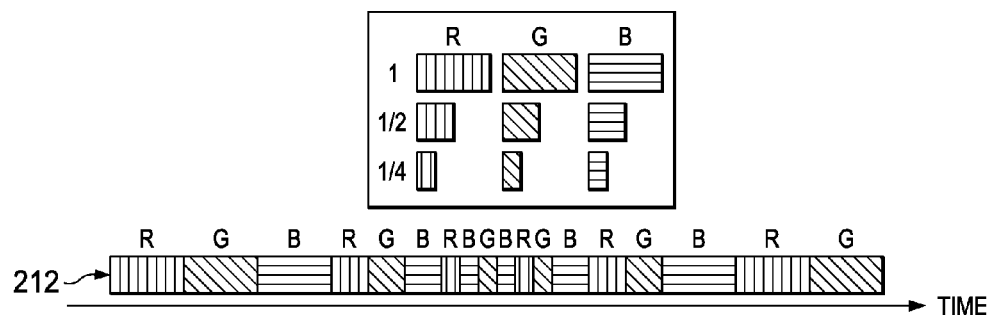
FIG. 2B is a prior-art diagram illustrating various lengths or "bit slices" of LED drive current pulses combined to create an example composite drive current signal to drive a color LED array.

FIG. 2B is a prior-art diagram illustrating various lengths or "bit slices" of LED drive current pulses combined to create an example composite drive current signal 212 to drive a color LED array. It is noted that, in this example, current pulses of equal bit-slice length are created for each primary color. Such balancing in the temporal domain may be done to create a net white point in the color domain. The bit-slice lengths for a particular group of primary colors, however, vary over time. The latter technique may assist in the visual integration of an image by the human eye to avoid the appearance of flicker, for example.

Figure 3:
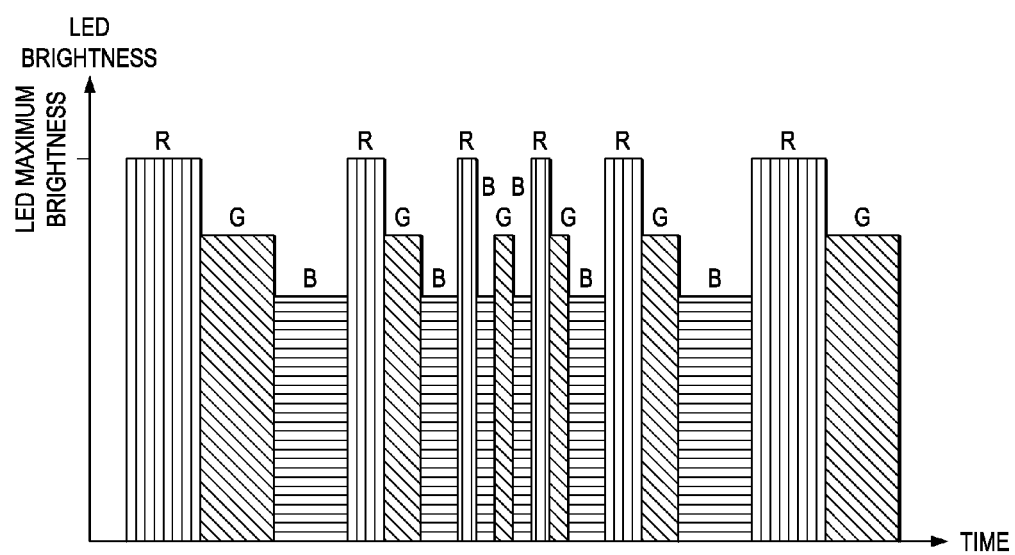
FIG. 3 is a prior-art diagram illustrating luminance over time of each primary color of a white-balanced output of a color LED array at full brightness.

FIG. 3 is a prior-art diagram illustrating luminance over time of each primary color of a white-balanced output of a color LED array at full brightness. Such luminous output may result from the current drive signal 212 of FIG. 2B. It is noted that the luminous intensity of each primary color is different in this example. Such magnitude differences may be implemented in order to maintain a given white point and avoid a color cast, given the equivalence of bit-slice periods for each primary color.

Figure 4:
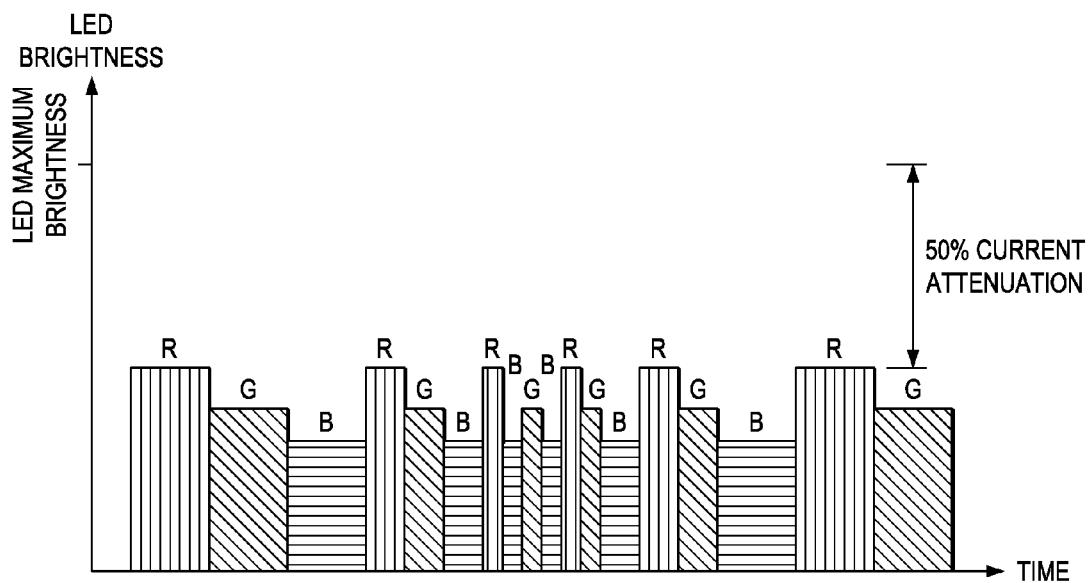
FIG. 4 is a prior-art diagram illustrating luminance over time of each primary color of a white-balanced output of a color LED array dimmed to 50% of full brightness by attenuating current flow through the LEDs.

FIG. 4 is a prior-art diagram illustrating luminance over time of each primary color of a white-balanced output of a color LED array dimmed to 50% of full brightness by attenuating current flow through the LEDs. Dimming via current flow attenuation is a traditional means of dimming, but is insufficient for high dimming ratios for at least the reasons mentioned above.

Figure 5:
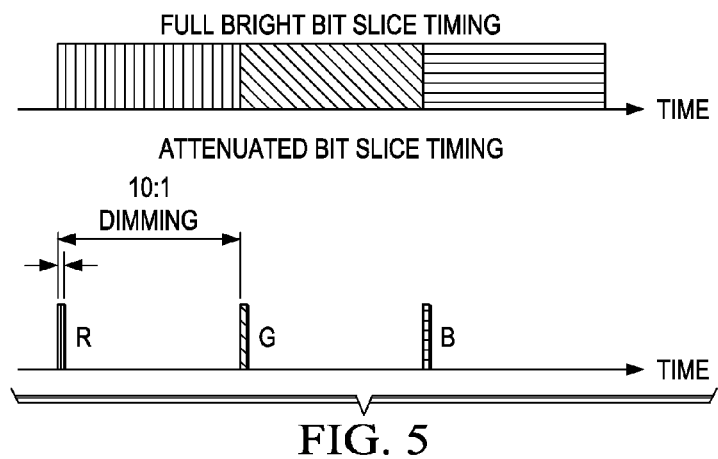
FIG. 5 is a diagram illustrating timing of current pulses associated with each primary color of a color LED array dimmed to 10% of full brightness by time-attenuating each bit slice according to various example embodiments of the invention.

FIG. 5 is a diagram illustrating timing of current pulses associated with each primary color of a color LED array dimmed to 10% of full brightness by time-attenuating each bit slice according to various example embodiments of the invention. Current is turned on for a selected portion of each bit slice period, resulting in a dimming ratio that is a function of the on-time.

Figure 6:
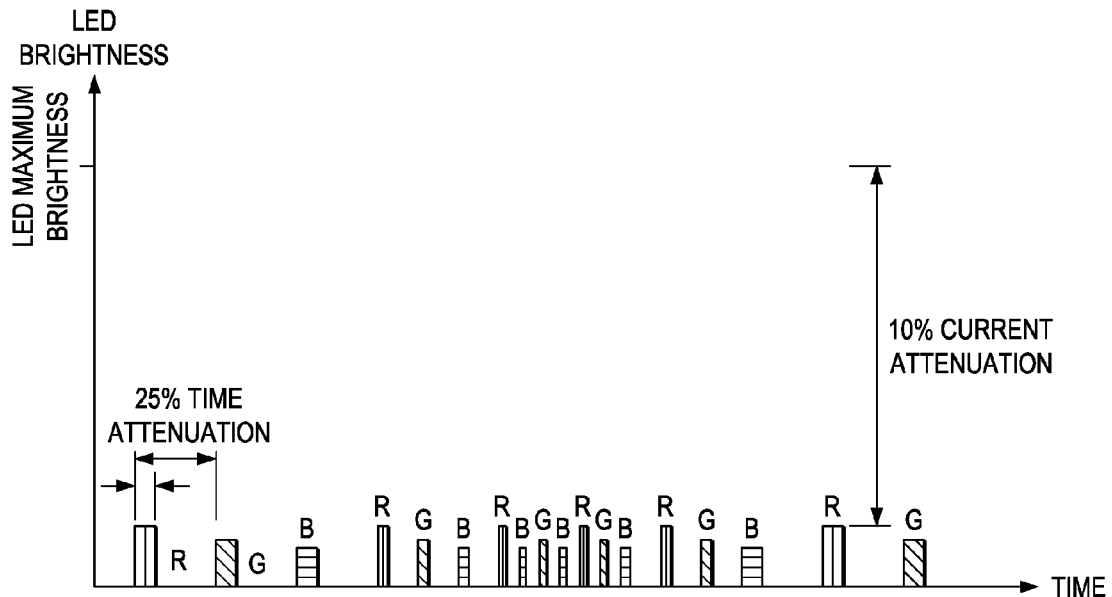
FIG. 6 is a diagram illustrating luminance over time of each primary color of a white-balanced output of a color LED array dimmed to 2.5% of full brightness using both current attenuation and time attenuation according to various example embodiments.

FIG. 6 is a diagram illustrating luminance over time of each primary color of a white-balanced output of a color LED array dimmed to 2.5% of full brightness using both current attenuation and time attenuation according to various example embodiments. Some embodiments operate in a manner referred to herein as continuous mode ("CM"). CM operation includes controlling both the magnitude of current through a selected LED and the on-time of the LED as a percentage of the bit-slice period. The net dimming ratio is a function of the mathematical product of the current attenuation and the time attenuation. In the example of FIG. 6, the attenuation is (0.10)*(0.25) or 2.5%.

Figure 7:
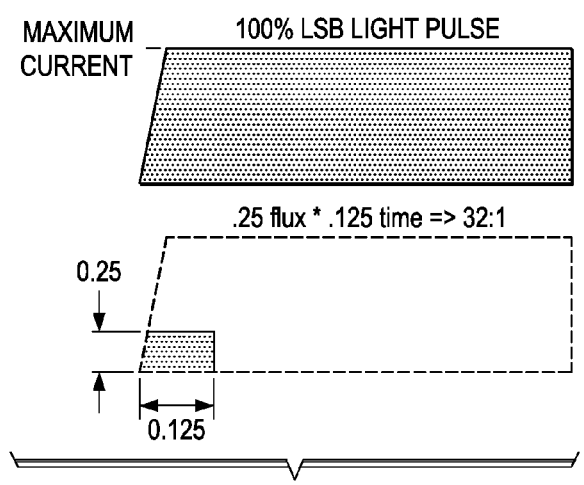
FIG. 7 is a diagram illustrating luminance over a single bit-slice time period of an LED operating in continuous mode according to various example embodiments.

FIG. 7 is a diagram illustrating luminance over a single bit-slice time period of an LED operating in CM according to various example embodiments. FIG. 7 illustrates a dimming ratio of 32:1 accomplished by limiting light flux magnitude to 25% of maximum available amplitude and limiting light flux pulse width to 12.5% of the bit-slice period, resulting in an attenuation factor of (25%)*(12.5%) =0.03125 or 32:1. Embodiments herein utilize CM operation in high ambient light situations when lower dimming ratios are appropriate.

Figure 8:
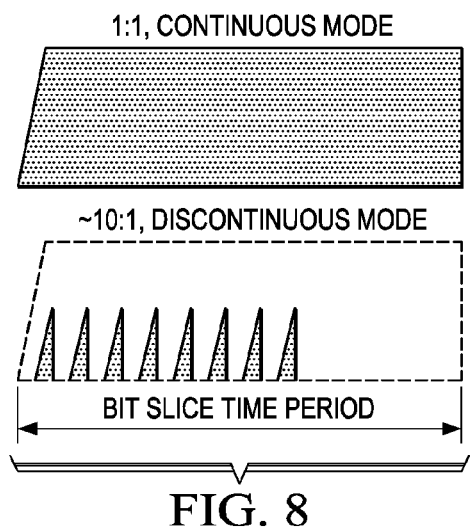
FIG. 8 is a diagram illustrating luminance pulses from an LED operating in discontinuous mode over a bit-slice period according to various example embodiments.

FIG. 8 is a diagram illustrating luminance pulses from an LED operating in a manner referred to herein as discontinuous mode ("DM") over a bit-slice period according to various example embodiments. During DM operation, multiple light flux pulses of a selected magnitude are generated.

Figure 9:
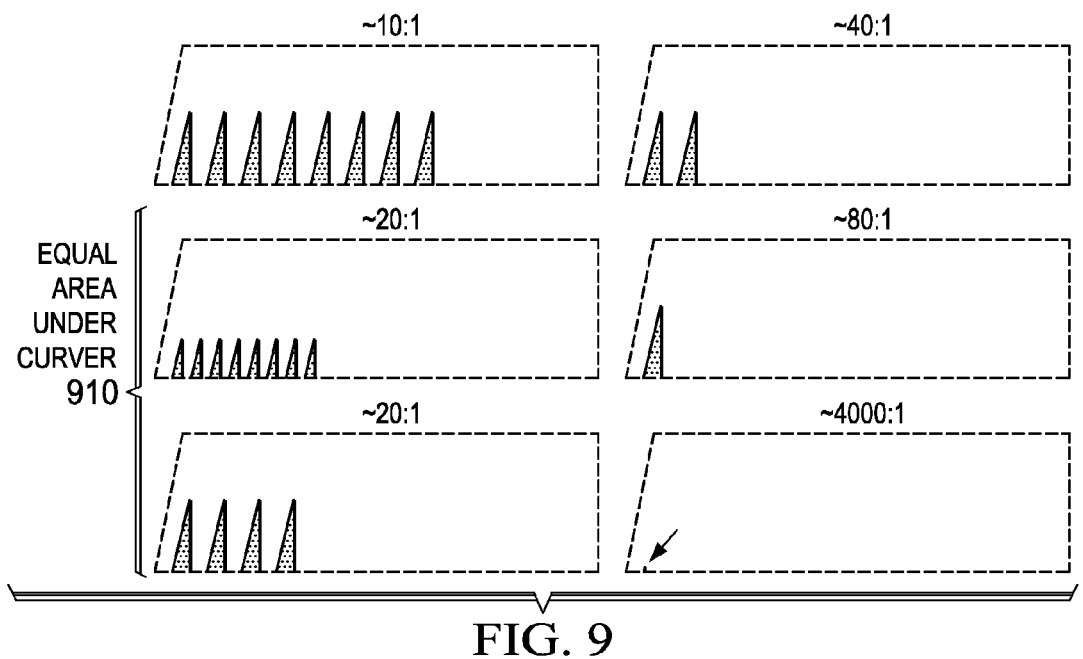
FIG. 9 is a diagram illustrating luminous pulses over a bit-slice period of an LED operating in discontinuous mode for various example dimming ratios achievable by varying the number and amplitude of pulses according to various example embodiments.

FIG. 9 is a diagram illustrating luminous pulses over a bit-slice period of an LED operating in DM for various example dimming ratios according to various example embodiments. A flux magnitude feedback loop is used to very accurately control flux pulse magnitude such that extremely small pulses may be created, as further described below. DM operation is utilized by embodiments herein in low ambient light conditions when very large dimming ratios are appropriate. The two examples 910 illustrates that the dimming ratio (e.g., in this example 20:1) may be controlled via the number and/or sizes of the multiple light flux pulses.

Figure 10A:
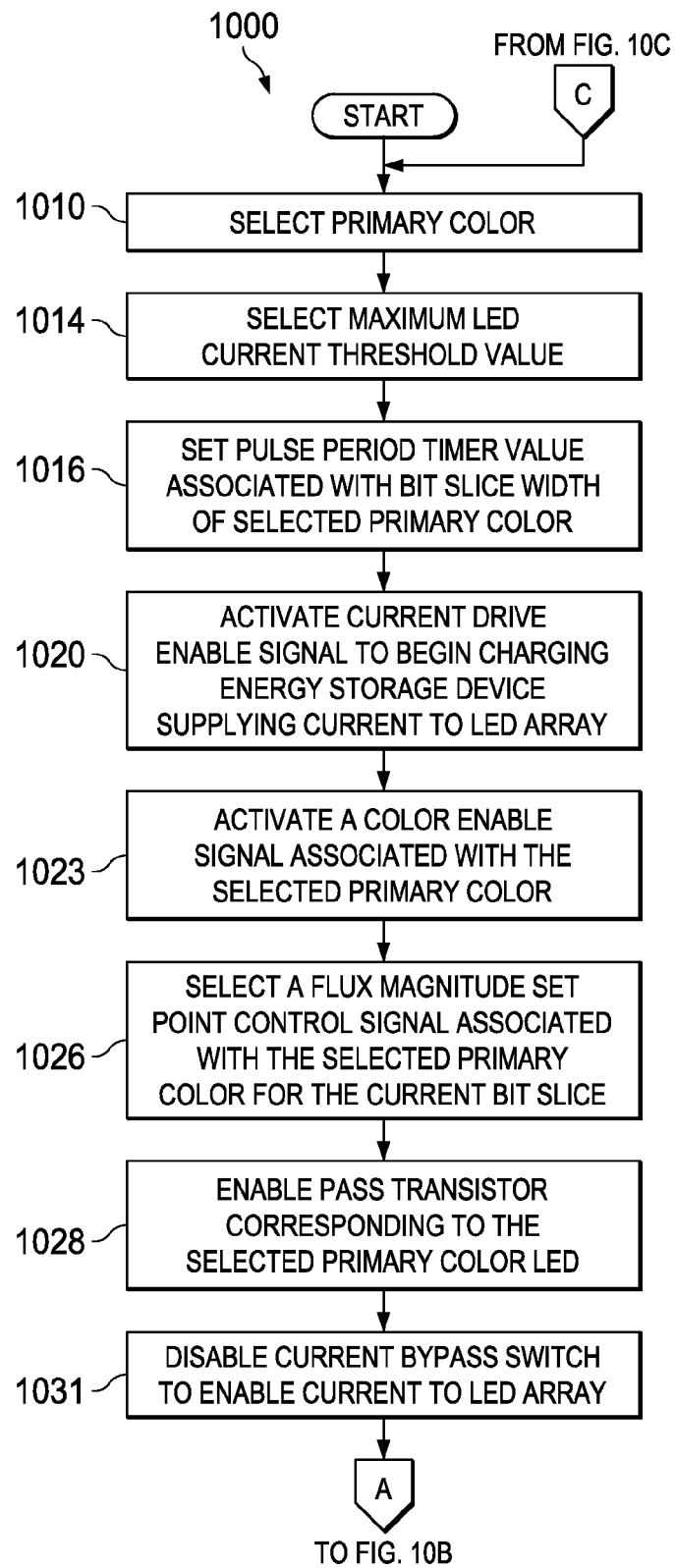
FIGS. 10A, 10B and 10C are a flow diagram illustrating a method of controlling a level of luminance produced by a color LED array according to various example sequences.
Figure 10B:
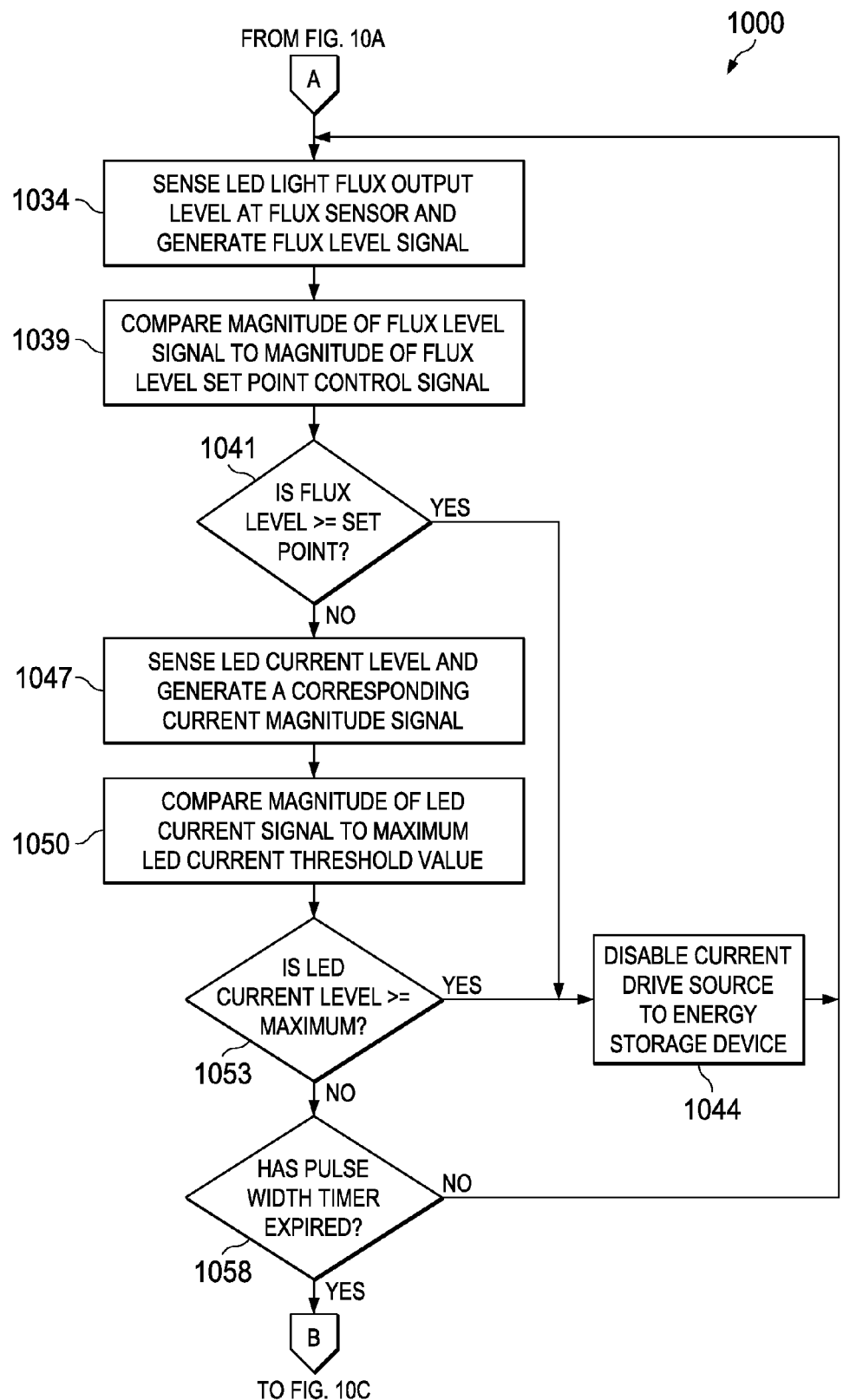
Figure 10C:
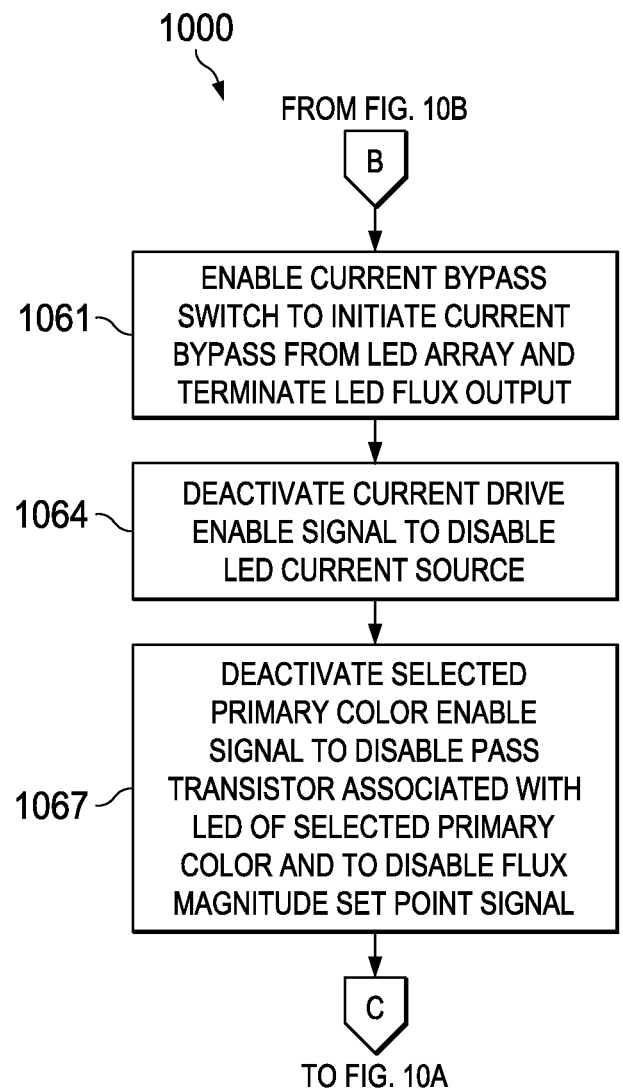
Figure 11:
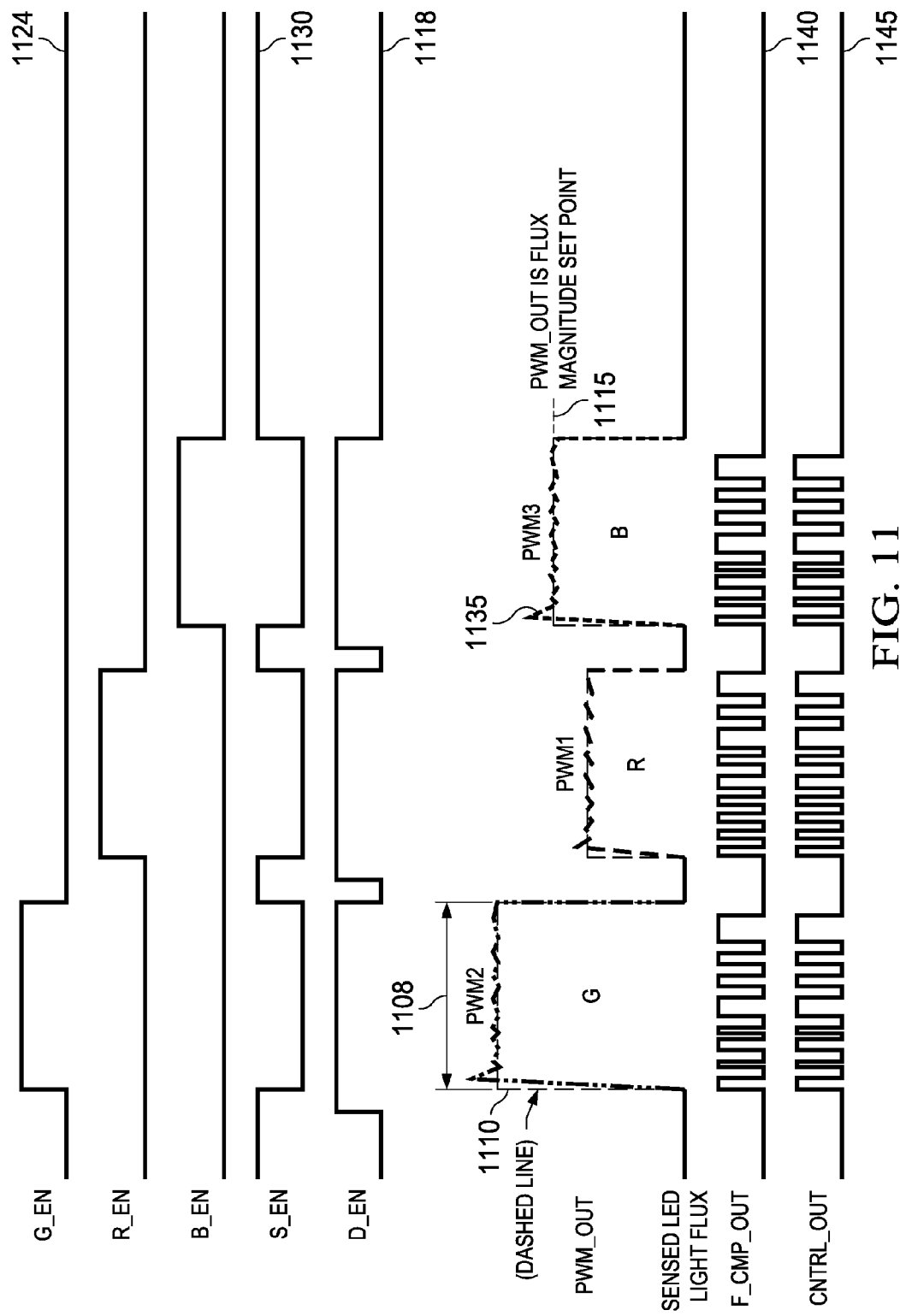
FIG. 11 is a timing diagram illustrating timing associated with continuous-mode operation according to the various example sequences illustrated by the method of FIGS. 10A, 10B and 10C.

FIGS. 10A, 10B, and 10C are a flow diagram illustrating a method 1000 of controlling a level of luminance produced by a color LED array according to various example sequences. FIG. 11 is a timing diagram illustrating timing associated with CM operation according to the various example sequences illustrated by the method of FIGS. 10A, 10B and 10C. The following description of the method 1000 will reference the timing diagram of FIG. 11 in order to better understand control methods associated with CM operation.

The method 1000 includes selectively charging an energy storage device and discharging the energy storage device through the selected primary color LED to generate a light flux output during the flux bit-slice period (e.g., the period 1108 illustrated by the dashed-line waveform 1110 of FIG. 11). The method 1000 also includes adjusting a rate of selectively charging the energy storage device in order to maintain a magnitude of the light flux output at the predetermined light flux magnitude set-point (e.g., the set-point 1115) of FIG. 11) during the flux bit-slice period. In some versions, the method 1000 further includes adjusting the predetermined light flux magnitude set-point over the life of the selected LED as the selected LED ages. The amount of aging and corresponding adjustment in set-point is a function of the anode-to-cathode voltage drop across the selected LED for a given magnitude of current through the selected LED.

The method 1000 commences at block 1010 with selecting a primary color for the current bit-slice period and continues at block 1014 with selecting a maximum LED current threshold value. The method 1000 also includes setting a pulse period timer value associated with the flux bit-slice period 1108, at block 1016. The method 1000 further includes activating a current drive enable signal (e.g., the signal "D_EN" 1118 of FIG. 11) to begin charging the energy storage device, at block 1020.

The method 1000 continues at block 1023 with activating a color enable signal (e.g., the "G_EN" signal 1124 of FIG. 11) associated with the selected primary color. The method 1000 includes selecting a predetermined light flux magnitude set-point control signal (e.g., the control signal 1110) associated with the selected primary color using the color enable signal (e.g., the color enable signal 1124), at block 1026. The method 1000 also includes enabling a pass transistor corresponding to an LED of the selected primary color using the color enable signal, at block 1028.

The method 1000 continues at block 1031 with disabling a current bypass switch used to shunt current away from the LED array. In some versions of the method 1000, the latter operation may be accomplished by transitioning a "shunt enable signal" (e.g., the "S_EN" signal of FIG. 11) to a low state. The method 1000 includes sensing the magnitude of the light flux output from the selected LED at a flux sensor and generating a corresponding flux level signal (e.g., the signal 1135 of FIG. 11), at block 1034. The method 1000 also includes comparing the sensed magnitude of the light flux output from the selected LED to the light flux magnitude set-point, at block 1039. The result of the compare operation is illustrated by example as the "F_CMP_OUT" signal 1140 of FIG. 11). The method 1000 further includes determining if the sensed magnitude of the light flux output is greater than or equal to the light flux magnitude set-point, at block 1041. If so, the method 1000 includes disabling a current drive source (e.g., via the signal "CNTRL_OUT" 1145) to the energy storage device, at block 1044, until the sensed magnitude of the light flux output is less than the light flux magnitude set-point as determined at block 1041.

If the sensed magnitude of the light flux output is less than the light flux magnitude set-point, the method 1000 continues at block 1047 with sensing a magnitude of current flowing through the selected primary color LED and generating a corresponding current magnitude signal. The method 1000 includes comparing the sensed magnitude of current flowing through the selected primary color LED to a maximum LED current threshold value, at block 1050. The method 1000 also includes determining whether the sensed magnitude of current flowing through the selected primary color LED is equal to or greater than the maximum LED current threshold value, at block 1053. If so, the method 1000 includes disabling the current drive source to the LED array to limit the magnitude of current flowing through the selected primary color LED to the maximum LED current threshold value, at block 1044, and continuing to sense the level of the light flux output, at block 1034.

The method 1000 continues at block 1058 with determining whether the flux bit-slice timer has expired. If not, the method 1000 includes continuing to sense the level of the light flux output, at block 1034. If the flux bit-slice timer value has expired, the method 1000 includes enabling the current bypass switch to sharply terminate current flow through the selected LED, at block 1061. Upon flux bit-slice timer expiration, the method 1000 also includes deactivating the current drive enable signal to disable the LED current source, at block 1064, and deactivating the primary color enable signal, at block 1067. The latter operation in turn disables the pass transistor associated with the selected LED and de-selects the flux magnitude set-point signal.

Figure 12A:
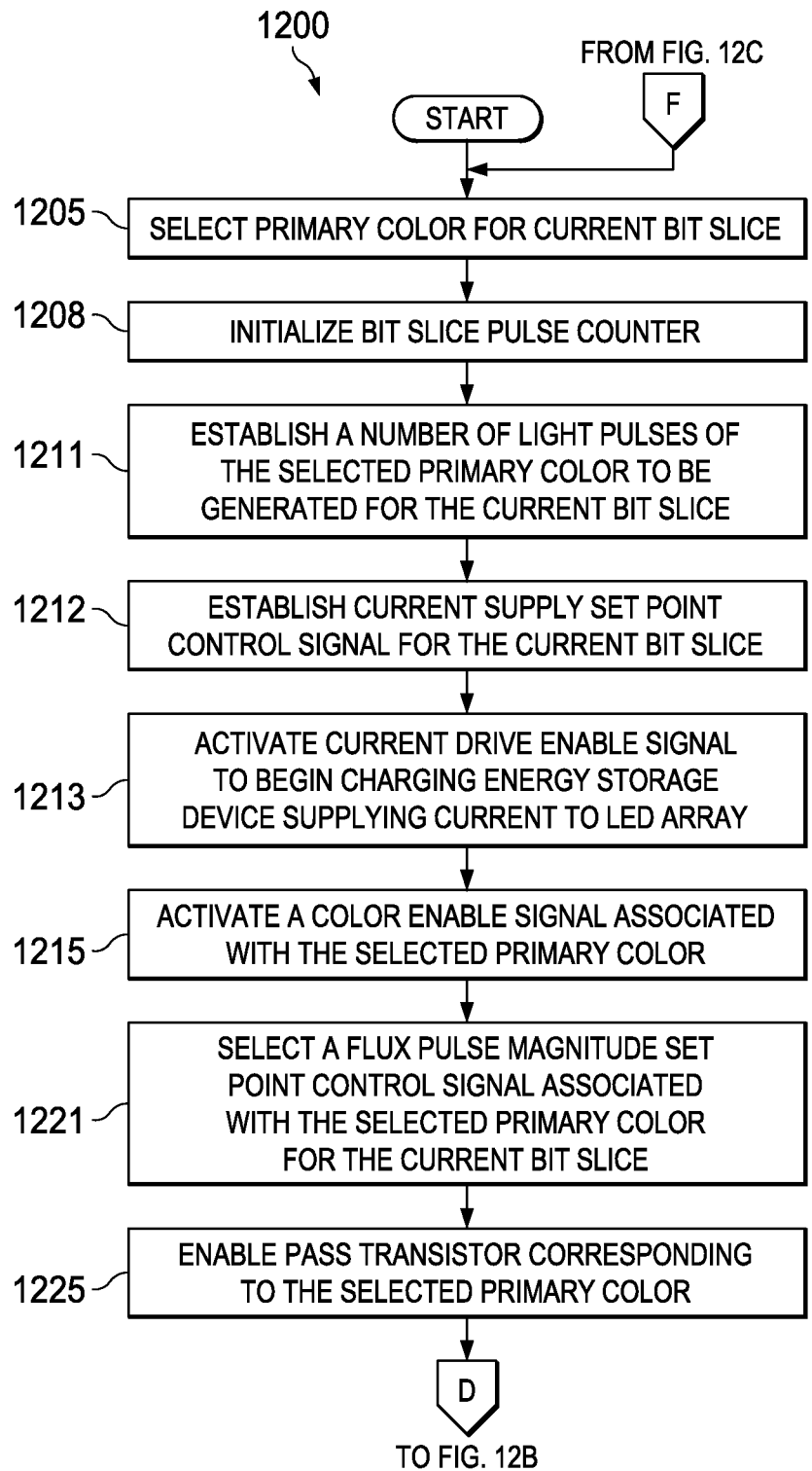
FIGS. 12A, 12B and 12C are a flow diagram illustrating a method of dimming a color LED array in discontinuous-mode operation according to various example sequences.
Figure 12B:
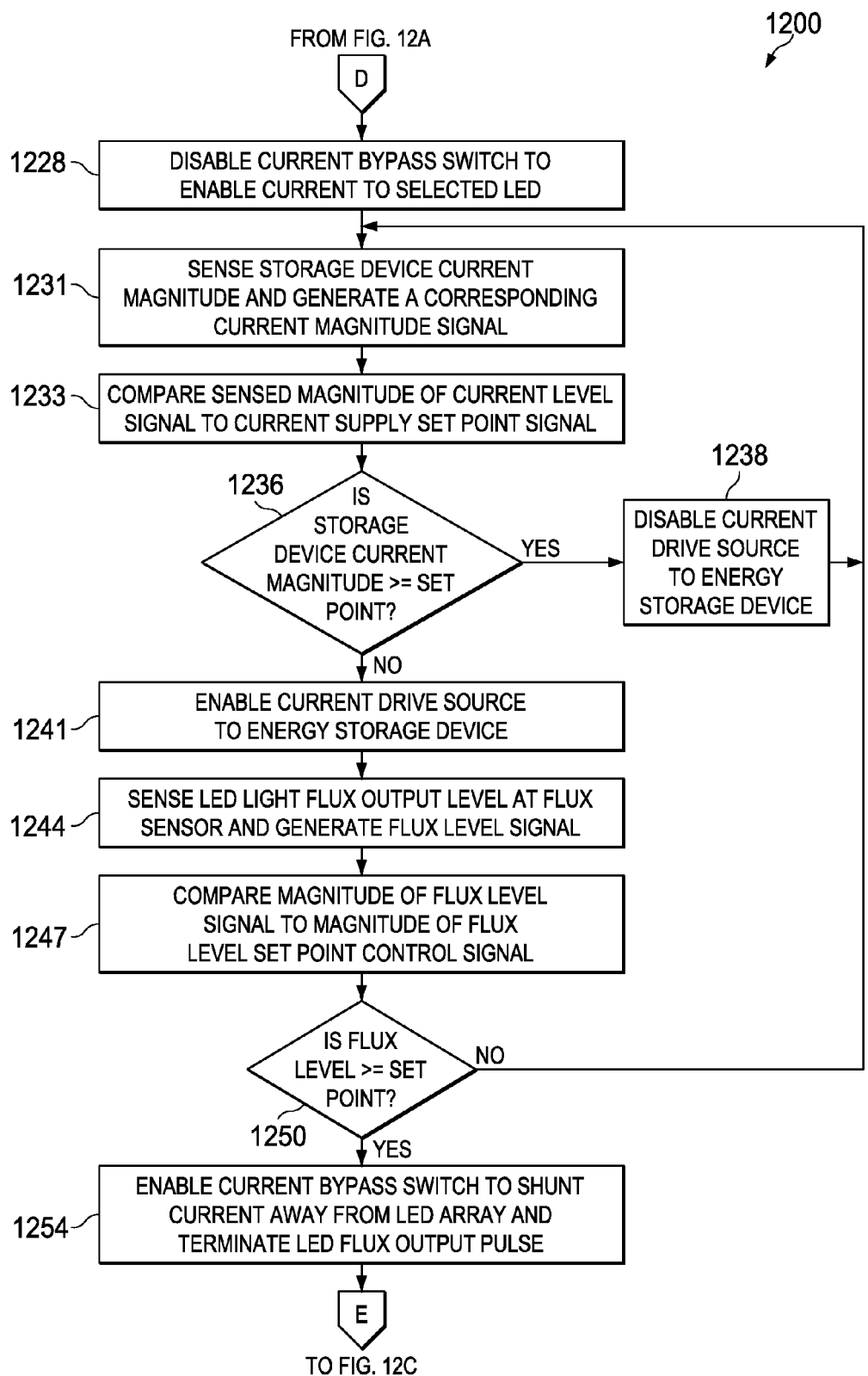
Figure 12C:
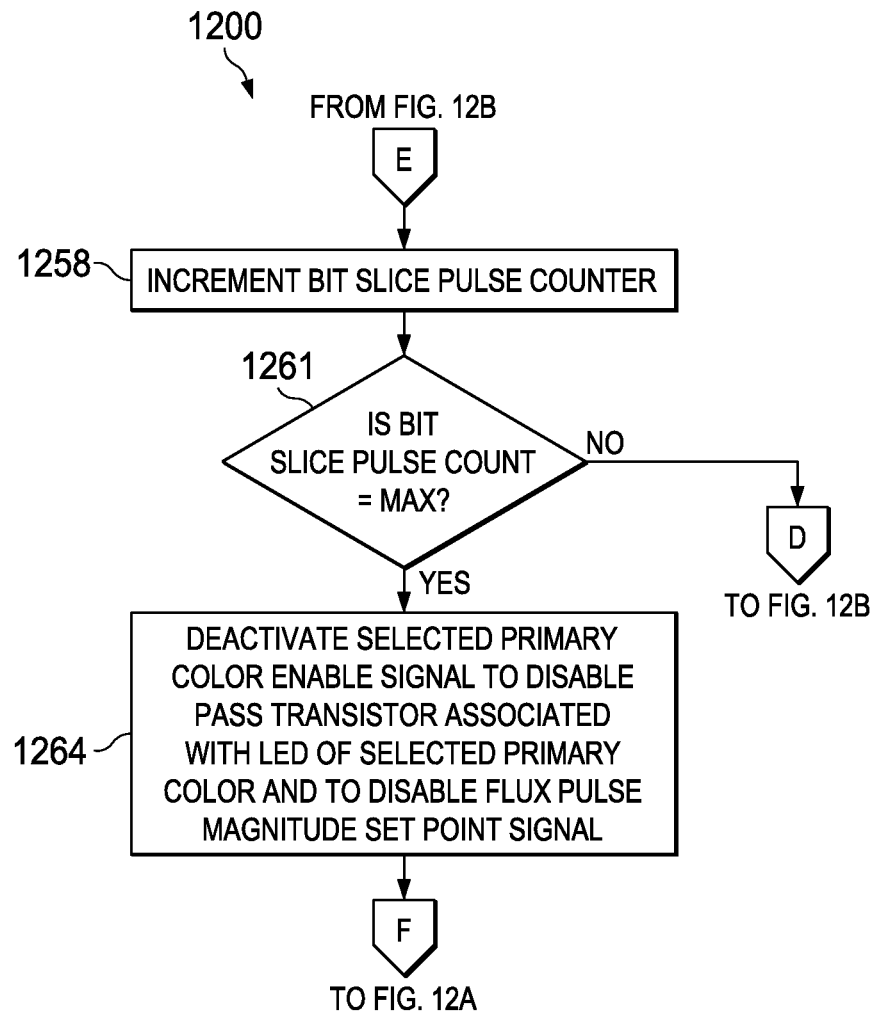
Figure 13A:
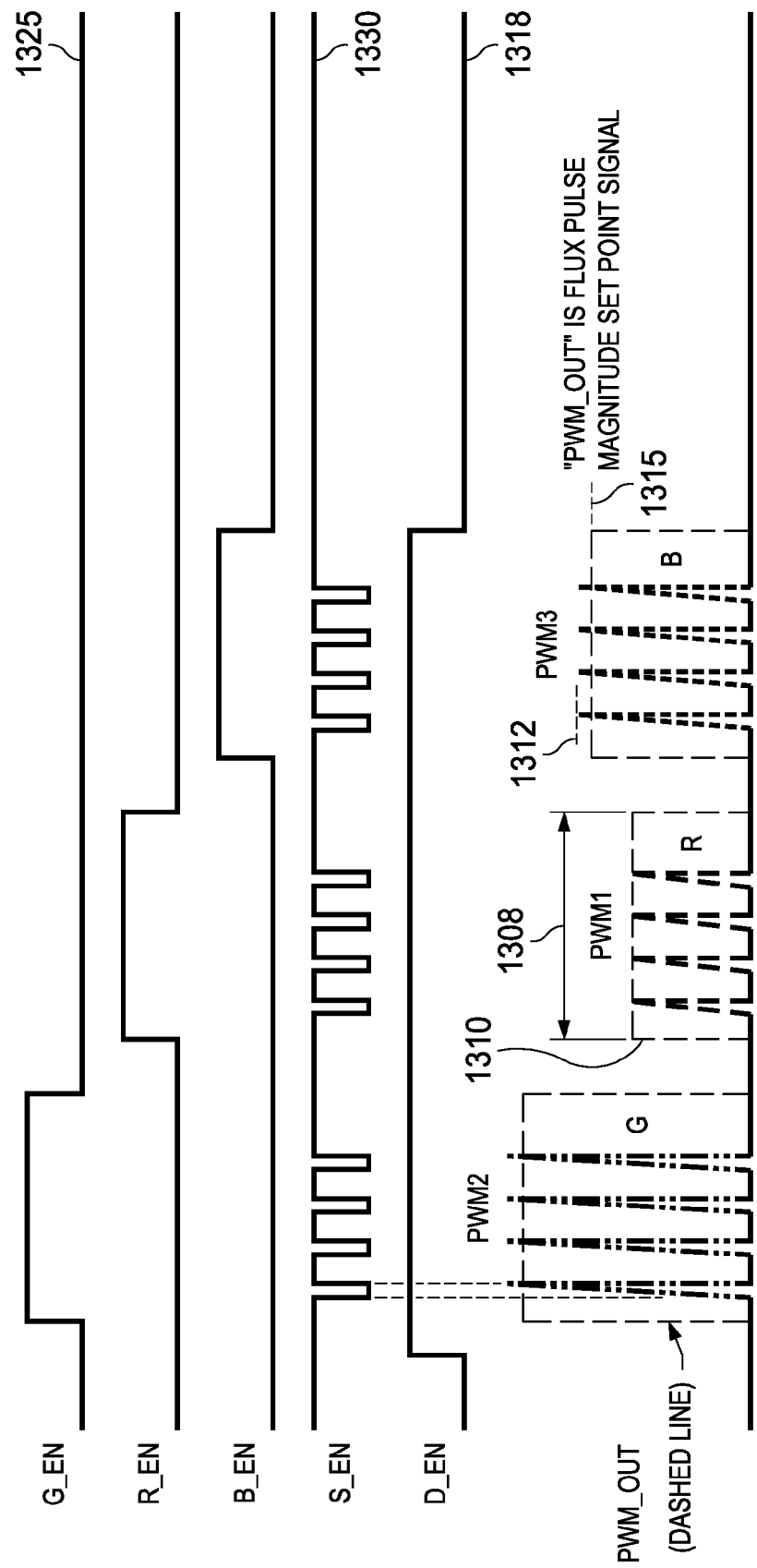
FIG. 13A is a timing diagram illustrating timing associated with discontinuous-mode operation according to the various example sequences illustrated by the method of FIGS. 12A, 12B and 12C.
Figure 13B:
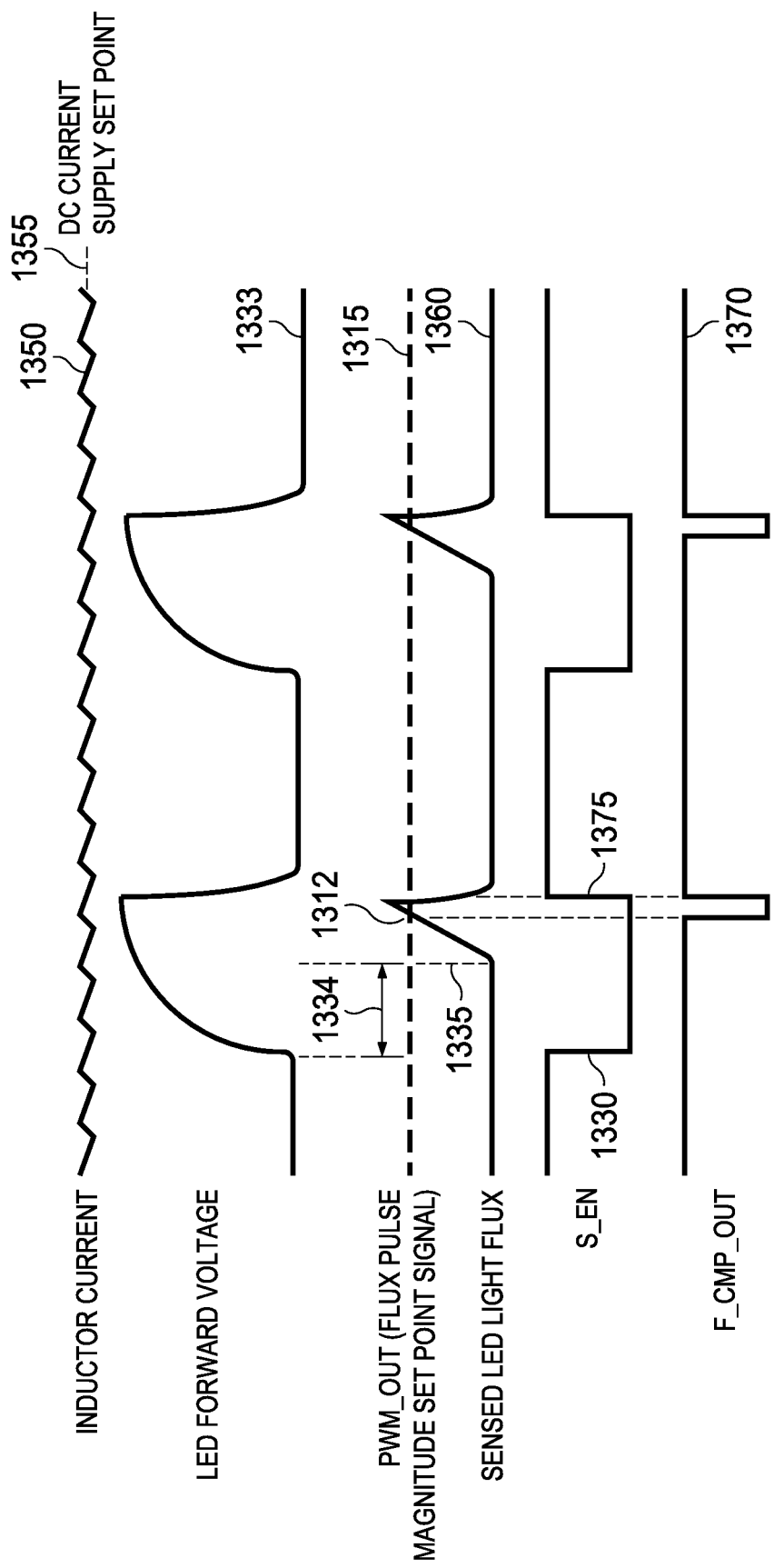
FIG. 13B is a timing diagram with an expanded time axis illustrating timing associated with discontinuous-mode operation according to the various example sequences illustrated by the method of FIGS. 12A, 12B and 12C.

FIGS. 12A, 12B and 12C are a flow diagram illustrating a method 1200 of dimming a color LED array in discontinuous-mode (DM) operation according to various example sequences. FIG. 13A is a timing diagram illustrating timing associated with DM operation according to the various example sequences illustrated by the method of FIGS. 12A, 12B and 12C. FIG. 13B is a timing diagram with an expanded time axis illustrating timing associated with DM operation according to the various example sequences illustrated by the method of FIGS. 12A, 12B and 12C.

The method 1200 includes discharging current from an energy storage device into a selected LED during a flux bit-slice period (e.g., the period 1308 of FIG. 13A) to create each of one or more light flux pulses (e.g., the four red pulses within the dashed-line waveform 1310). The method 1200 also includes bypassing current from the selected LED and recharging the energy storage device when a sensed light flux magnitude (e.g., the magnitude 1312 of FIGS. 13A and 13B) reaches a light flux magnitude set-point control signal amplitude (e.g., the magnitude set-point amplitude 1315 of FIGS. 13A and 13B) in order to quickly terminate each light flux pulse.

In some versions, the method 1200 may also include making adjustments for LED aging over the life of the selected LED in order to maintain a consistent white point. Such adjustments may include adjusting the predetermined light flux pulse magnitude set-point and/or the number of light flux pulses to be generated during the flux bit-slice period. Aging may be determined by measurements taken of the anode-to-cathode voltage drop across the selected LED for a given magnitude of current flowing through the selected LED.

The method 1200 commences at block 1205 with selecting a primary color for the current bit-slice period and continues at block 1208 with initializing a bit-slice pulse counter used to track the number of light flux pulses. The method 1200 includes establishing a number of light flux pulses to be generated during the flux bit-slice period, at block 1211. The method 1200 also includes establishing a current supply set-point control signal for the current bit-slice, at block 1212. The method 1200 further includes activating a current drive enable signal (e.g., the "D_EN" signal 1318 of FIG. 13A) to begin charging the energy storage device supplying current to the LED array, at block 1213.

The method 1200 also includes activating a color enable signal (e.g., the "G EN" signal 1325 of FIG. 13A) associated with the primary color, at block 1215. The color enable signal is used to select the primary color LED and the predetermined light flux pulse magnitude set-point for the predetermined flux bit-slice period.

The method 1200 continues at block 1221 with selecting the flux pulse magnitude set point control signal (e.g., "PWM_OUT" 1315 of FIGS. 13A and 13B) associated with the selected primary color for the bit-slice period. The method 1200 also includes enabling a pass transistor corresponding to the selected LED, at block 1225. The method 1200 further includes disabling a current bypass switch to enable current from the energy storage device to the selected LED, at block 1228. In some versions of the method 1200, a falling edge of a shunt enable signal (e.g., "S_EN" 1330 of FIGS. 13A and 13B) may be used to disable the current bypass switch. As bypassed current begins to decrease, forward voltage at the selected LED (e.g., the forward voltage signal 1333 of FIG. 13B) begins to increase during the period 1334. Current begins to flow through the selected LED and light flux begins to be sensed at the point 1335.

The method 1200 also includes maintaining an available current (e.g., the current 1350 of FIG. 13B) through an energy storage device such as an inductor used to supply current to the LED array. The method 1200 thus includes sensing a magnitude of current flowing through the energy storage device and generating a corresponding current magnitude signal, at block 1231. The method 1200 also includes comparing the magnitude of current flowing through the energy storage device to the current supply set-point control signal (e.g., the set-point control signal 1355 of FIG. 13B), at block 1233. The method 1200 further includes determining whether the magnitude of current flowing through the energy storage device is greater than or equal to the magnitude of the current supply set-point control signal, at block 1236. If so, the method 1200 includes disabling the current drive source at block 1238 to decrease current to the energy storage device until the magnitude of current flowing through the energy storage device is less than the magnitude of the current supply set-point control signal and then re-enabling the current source at block 1241.

The method 1200 continues at block 1244 with sensing the magnitude of the light flux output from the selected LED and generating a corresponding flux level signal (e.g., the flux level signal 1360 of FIG. 13B). The method 1200 includes comparing the magnitude of the sensed flux level signal 1360 to the magnitude of the flux level set-point control signal 1315, at block 1247. The method 1200 also includes determining whether the sensed magnitude of the light flux output is greater than or equal to the magnitude of the light flux magnitude set-point control signal, at block 1250. (See, e.g., the "F_CMP OUT" signal 1370 of FIG. 13B.) If not, the method 1200 continues with sensing energy storage device current magnitude at block 1231.

If the sensed magnitude of the light flux output is greater than or equal to the magnitude of the light flux magnitude set-point control signal (e.g., at the point 1312 of FIG. 13B), the method 1200 includes re-enabling the current bypass switch to shunt current away from the LED array and terminate the light flux output pulse from the selected LED, at block 1254. (See, e.g., the rising edge 1375 of the current bypass switch enable signal S_EN.) In the latter case, the method 1200 also includes incrementing the bit-slice pulse counter, at block 1258, and determining whether a count of the bit slice pulse counter is equal to the number of light flux pulses to be generated during the bit-slice period, at block 1261. If not, the method 1200 continues at block 1228 with generating an additional pulse.

If the count of the bit slice pulse counter is equal to the number of light flux pulses to be generated during the bit-slice period, the method 1200 includes deactivating the color enable signal to disable the pass transistor associated with the selected LED and to disable the flux pulse magnitude set-point signal, at block 1264. The method 1200 then repeats at block 1205 with selecting another primary color for a next bit-slice period.

Figure 14A:
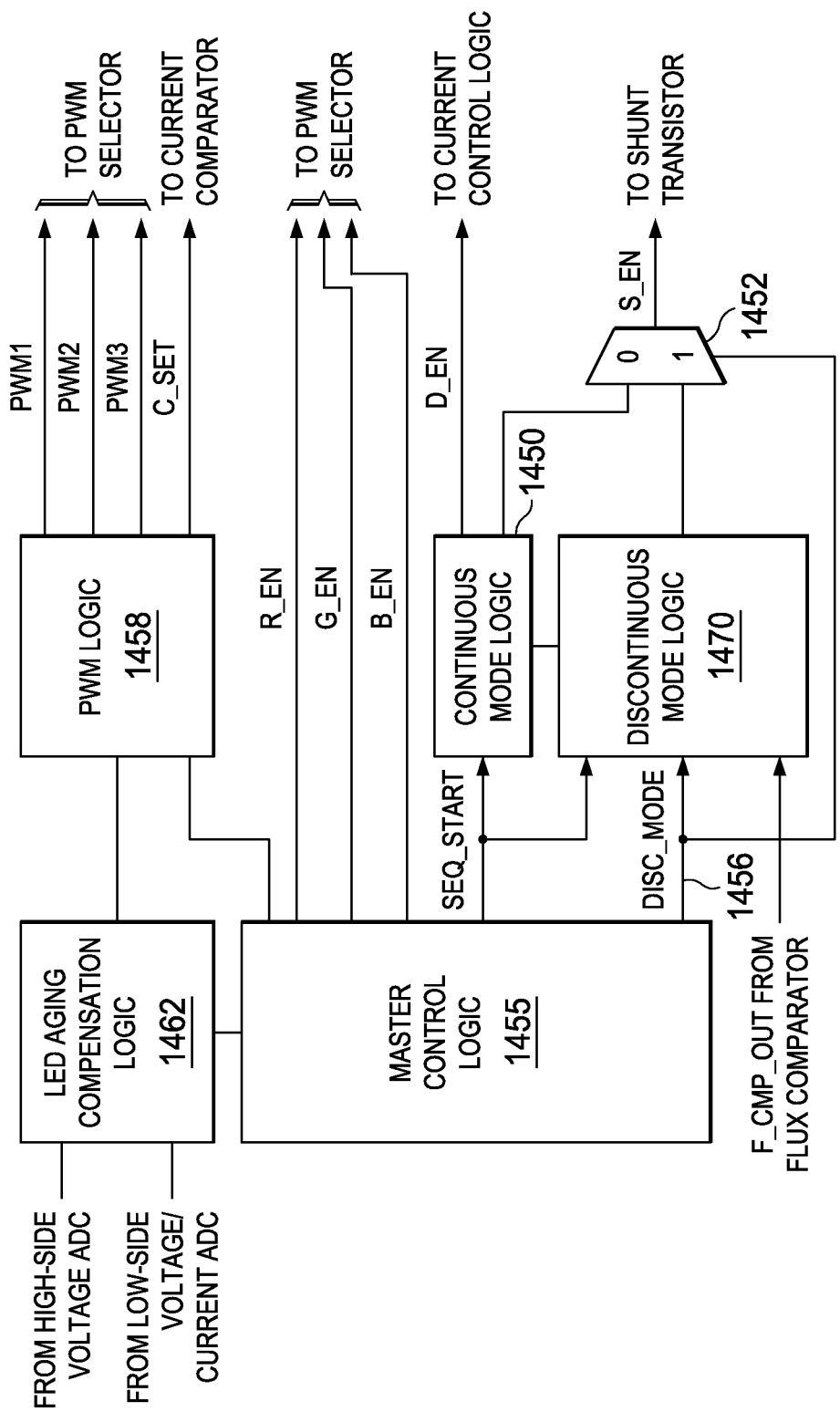
FIGS. 14A and 14B are a schematic diagram illustrating an apparatus for controlling levels of luminance produced by a color LED array according to various example embodiments.
Figure 14B:
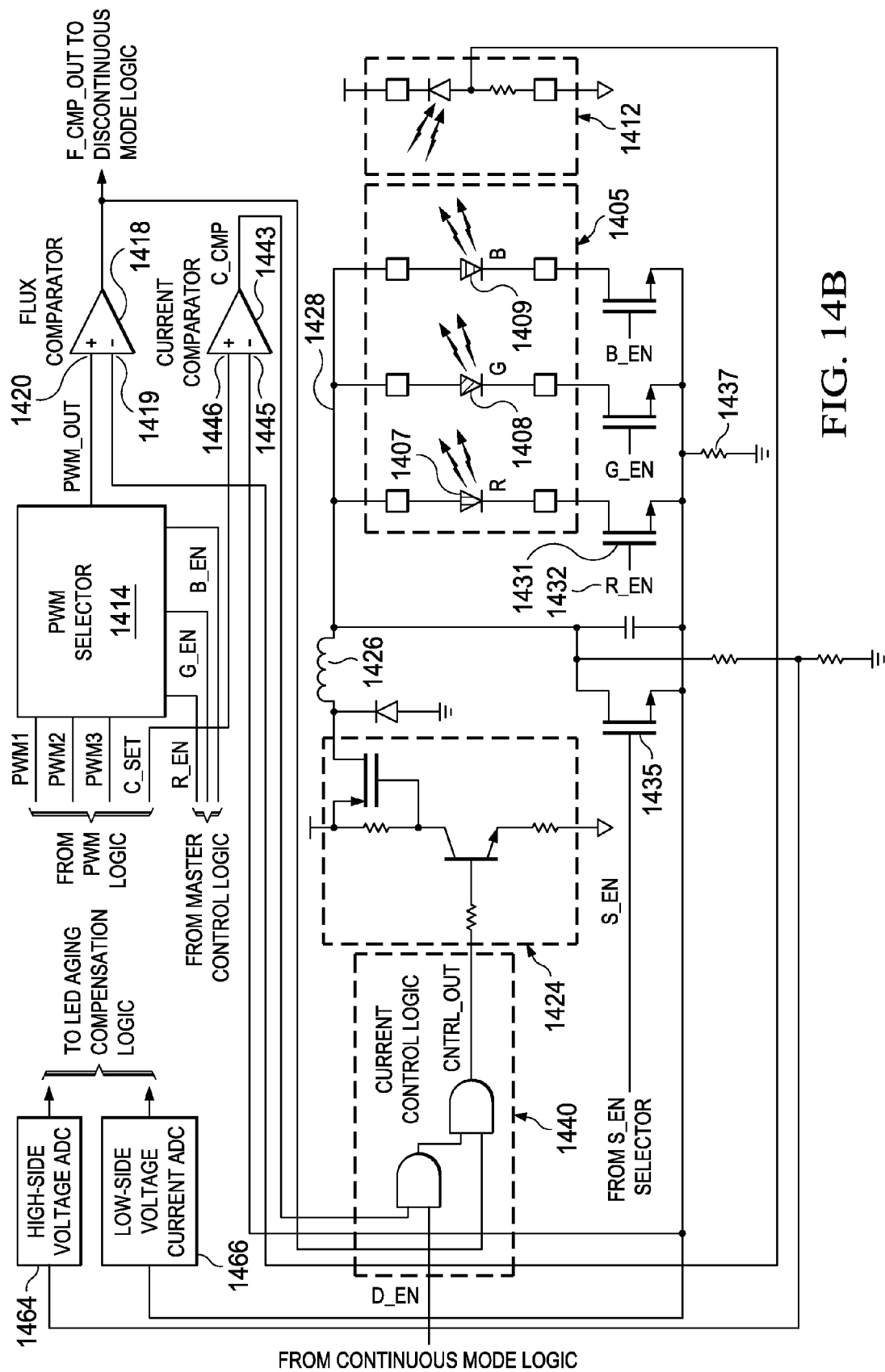

FIGS. 14A and 14B are a schematic diagram illustrating an apparatus 1400 for controlling luminance levels produced by a color LED array according to various example embodiments. The apparatus 1400 operates in two modes, continuous mode (CM) and discontinuous mode (DM). Operating in CM, the apparatus 1400 is capable of performing the method 1000 described above. Operating in DM, the apparatus 1400 is capable of performing the method 1200 described above. Said differently, some components of the apparatus 1400 operate in a certain way in CM and in a different way in DM. Consequently, the apparatus 1400 will be described twice, first in the context of CM operation and then in the context of DM operation.

Turning first to FIG. 14B, the apparatus 1400 includes a parallel array of LEDs 1405. The parallel array of LEDs 1405 consists of one or more LEDs 1407, 1408, and 1409 corresponding to each of three primary colors (e.g., Red, Green, and Blue). The apparatus 1400 also includes a light flux sensor 1412 flux-coupled to the LED array to sense a magnitude of light flux output from a selected LED.

Operating in CM, the apparatus 1400 further includes a pulse width modulation (PWM) selector 1414 communicatively coupled to the LED array 1405. The PWM selector 1414 selects a predetermined light flux magnitude set-point signal (e.g., PWM1, PWM2, or PWM3) corresponding to a predetermined primary color. The flux magnitude set-point signal PWM OUT is selected by a color enable signal (e.g., R_EN, G_EN, or B_EN) for a predetermined flux bit-slice period.

The apparatus 1400 also includes a flux comparator 1418 coupled to the PWM selector 1414 and to the light flux sensor 1412. The flux comparator 1418 compares the sensed magnitude of light flux output 1419 to the light flux magnitude set-point signal PWM OUT appearing at the input 1420.

The apparatus 1400 further includes a current drive circuit 1424 communicatively coupled to the flux comparator 1418. The current drive circuit 1424 selectively charges an energy storage device 1426 (e.g., an inductor) coupled between the current drive circuit 1424 and a common anode terminal 1428 of the LED array 1405. The energy storage device 1426 supplies current to the LED array 1405 when the sensed magnitude of light flux output is less than the light flux magnitude set-point.

The apparatus 1400 also includes a primary color pass transistor (e.g., the Red color pass transistor 1431) coupled in series with each primary color LED. Each pass transistor is capable of being enabled using a primary color enable signal (e.g., the R_EN signal 1432) to select an associated primary color LED (e.g., the Red LED 1407 in this example).

The apparatus 1400 further includes a current bypass switch 1435 coupled between an output 1428 of the energy storage device 1426 and a resistor 1437 to ground. The current bypass switch 1435 provides fast LED turn-on and turn-off times by selectively shunting current away from the LED array 1405.

The apparatus 1400 also includes a current control logic module 1440 coupled to the current drive circuit 1424. The current control logic module 1440 enables the current drive circuit 1424 during the bit-slice period when the sensed magnitude of light flux output (e.g., the signal appearing at the input 1419 of the flux comparator 1418) is less than the light flux magnitude set-point (e.g., the signal appearing at the input 1420 of the flux comparator 1418 and no overcurrent condition exists.

The apparatus 1400 further includes a current comparator 1443 coupled to the current control logic module 1440. A signal created by the voltage drop across the resistor 1437 is representative of the magnitude of current flowing through the selected primary color LED and appears at an input 1445 of the current comparator 1443. The current comparator 1443 compares the latter signal to a predetermined maximum LED current threshold signal "C_SET" appearing at an input 1446 of the current comparator 1443. The output "C_CMP" of the current comparator 1443 toggles the current control logic to maintain the magnitude of current flowing through the selected primary color LED at or below the predetermined maximum value of the LED current threshold signal "C_SET."

Turning now to FIG. 14A, the apparatus 1400 also includes a CM logic module 1450 communicatively coupled to the current control logic module 1440 of FIG. 14B. The CM logic module 1450 provides a drive enable signal "D_EN" for precise turn-on and turn-off of the selected LED (e.g., the Red LED 1407 when R_EN is active).

The CM logic module 1450 also provides a shunt enable signal "S_EN" to control the current bypass switch 1435. The apparatus 1400 further includes a master control logic module 1455 coupled to the CM logic module 1450. The master control logic module 1455 initiates a sequence of flux bit slices and generates the set of primary color enable signals R_EN, G_EN, and B_EN. The S_EN signal is selected from the CM logic module 1450 by a selector 1452 when a DM signal 1456 from the master control logic module 1455 is inactive.

The apparatus 1400 also includes a PWM logic module 1458 coupled to the PWM selector 1414. The PWM logic module 1458 generates the predetermined light flux magnitude set-point signals associated with the predetermined primary colors for the predetermined flux bit-slice periods. The PWM logic module 1458 also generates the predetermined maximum LED current threshold signal "C_SET."

The apparatus 1400 further includes an LED aging compensation logic module 1462 coupled to the PWM logic module 1458. The LED aging compensation logic module 1462 monitors the anode-to-cathode voltage drop across the selected LED for a given current flowing through the selected LED to determine how the LED characteristic curve ages over time. The LED aging compensation logic module 1462 then adjusts the predetermined light flux magnitude set-point during the life of the selected LED as the selected LED ages. The apparatus 1400 includes a high-side voltage analog-to-digital converter (ADC) 1464 coupled to the LED aging compensation logic module 1462. The high-side voltage ADC converts a sensed anode voltage of the selected LED to a digital signal for analysis by the LED aging compensation logic module 1462. The apparatus 1400 also includes a low-side voltage and current ADC 1466 coupled to the LED aging compensation logic module 1462. The low-side voltage and current ADC 1466 converts a sensed cathode voltage of the selected LED to a digital signal for analysis by the LED aging compensation logic module 1462.

The apparatus 1400 will now be described with reference to its structure and operation in DM. Operating in DM, the apparatus 1400 includes the parallel array of LEDs 1405 and the light flux sensor 1412 as previously described in the context of CM operation. The apparatus 1400 also includes the PWM selector 1414 communicatively coupled to the LED array 1405. Operating in DM, the PWM selector 1414 selects a predetermined light flux magnitude set-point signal associated with a predetermined primary color for a predetermined number of light flux pulses to be generated during a bit-slice period.

The flux comparator 1418 is coupled to the PWM selector 1414 and to the light flux sensor 1412 to compare the sensed magnitude of light flux output to the light flux magnitude set-point signal. The current bypass switch 1435 is coupled between the output 1428 of the energy storage device 1426 and the resistor 1437 to ground. The current bypass switch 1435 is to be disabled to initiate a ramp-up of LED forward voltage in order to create a leading edge of a light flux pulse and to be enabled to shunt current away from the selected LED in order to terminate the light flux pulse when the sensed magnitude of light flux output is equal to or greater than the light flux magnitude set-point, as described above with reference to FIG. 13B.

Operating in DM, the apparatus 1400 includes the primary color pass transistors 1407, 1408, and 1409, each coupled in series with a primary color LED, each pass transistor capable of being enabled using a primary color enable signal to select an associated primary color LED, as previously described with regard to CM operation.

The apparatus 1400 also includes the current comparator 1443 communicatively coupled to the LED array 1405. In DM, the current comparator 1443 compares the magnitude of current flowing through the energy storage device 1426 to a predetermined magnitude of current to be regulated through the energy storage device 1426. The current drive circuit 1424 is communicatively coupled to the energy storage device 1426 to selectively charge the energy storage device 1426. The current control logic module 1440 coupled between the current comparator 1443 and the current drive circuit 1424 enables the current drive circuit 1424 when the magnitude of current flowing through the energy storage device is less than the predetermined magnitude of current to be regulated through the energy storage device.

The apparatus 1400 further includes a DM logic module 1470 communicatively coupled to the current bypass switch 1435. The DM logic module 1470 selectively enables and disables the current bypass switch 1435 via the S EN signal to control the width of each light flux pulse. (See, e.g., the S_EN waveform 1330 of FIG. 13B.) When the sensed light flux pulse reaches the flux pulse magnitude set-point 1315 at the point 1312, the waveform 1370 of the flux comparator output F CMP OUT goes low. F CMP OUT is an input to the DM logic module 1470 and results in S_EN transitioning to a high state. The high state of S_EN turns on the current bypass switch, which abruptly shunts current stored in the energy storage device away from the selected LED and thus abruptly terminates the flux pulse.

The master control logic module 1455 is coupled to the DM logic module 1470 to establish DM operation when large dimming ratios are desirable due to low ambient light levels. The master control logic module 1455 initiates a sequence of flux bit slices and sequences a set of primary color enable signals used to select the predetermined light flux magnitude set-point signal associated with the predetermined primary color for the predetermined number of light flux pulses. The master control logic module 1455 also loads a lookup table (LUT) (not shown) located in the DM logic module with the number of pulses to be generated for the current and/or subsequent bit-slices. At run-time, the LUT resets the S_EN signal 1330 to initiate each pulse.

The PWM logic module 1458 is coupled to the PWM selector 1414 in DM to generate the predetermined light flux magnitude set-point signal associated with the predetermined primary color for the predetermined number of light flux pulses to be generated during the bit-slice period. The PWM logic module 1458 also generates a signal C_SET representing the predetermined magnitude of current to be regulated through the energy storage device.

The LED aging compensation logic module 1462 and associated ADCs 1464 and 1466 are structured and operate in DM as described above in the context of CM operation.

Figure 15:
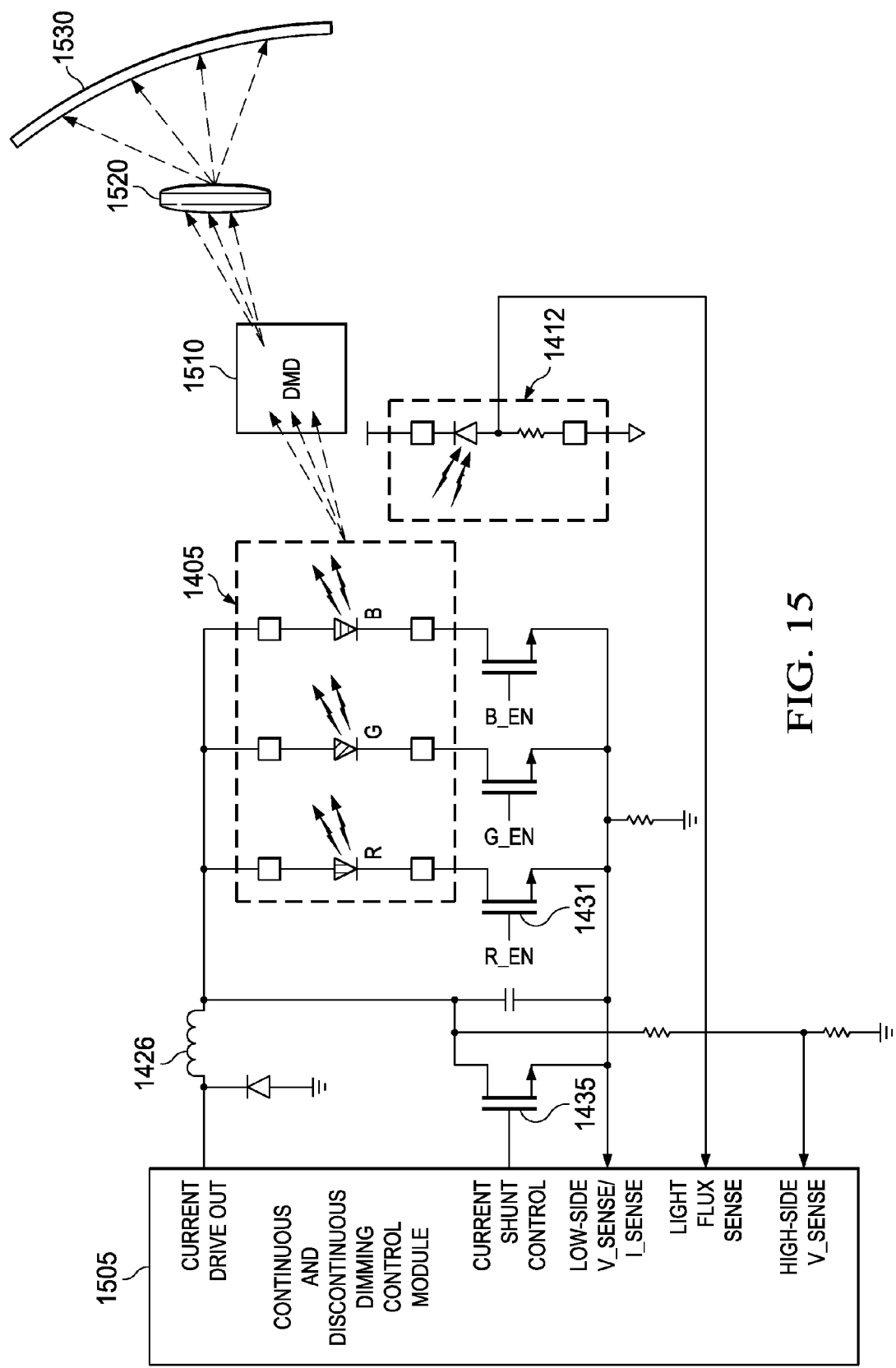
FIG. 15 is a system diagram illustrating an example head-up display system utilizing apparatus for controlling levels of luminance produced by a color LED array according to various example embodiments.

FIG. 15 is a system diagram illustrating an example HUD system 1500 utilizing apparatus for controlling levels of luminance produced by a color LED array according to various example embodiments. The HUD system 1500 includes a parallel array of LEDs 1405 consisting of at least one LED corresponding to each of three primary colors. The HUD system 1500 also includes an energy storage device 1426 coupled to the LED array 1405 to supply current to the LED array 1405. The HUD system 1500 further includes a current bypass switch 1435 coupled to the energy storage device 1426. The current bypass switch 1435 shunts current away from a selected LED in order to provide a fast turn-off time. The HUD system 1500 further includes a light flux sensor 1412 flux-coupled to the LED array 1405 to sense a magnitude of a light flux output from a selected LED. The HUD system 1500 also includes a primary color pass transistor (e.g., the pass transistor 1431) coupled in series with each primary color LED Each pass transistor is capable of being enabled using a primary color enable signal to select an associated primary color LED.

The HUD system 1500 also includes a CM and DM dimming control module 1505. The control module 1505 receives a light flux sense signal from light flux sensor 1412 as well as a high side voltage sense signal and a low side voltage sense and current sense signal from the LED array 1405. The dimming control module 1505 controls current supplied to the energy storage device 1426 and controls the state of the current bypass switch 1435 as described above in the contexts of CM and DM operation.

As such, the dimming control module 1505 includes the pulse width modulation (PWM) selector 1414, the flux comparator 1418, the current drive circuit 1424, the current comparator 1443, the current control logic module 1440, the CM logic module 1450, the DM logic module 1470, the master control logic module 1455, the PWM logic module 1458, the LED aging compensation logic module 1462, the high-side ADC 1464, and the low-side voltage and current ADC 1466, all coupled together as described above to operate as described above in the contexts of CM and DM operation.

The HUD system 1500 also includes a digital micromirror device (DMD) 1510 optically coupled to the LED array 1405. The DMD 1510 consists of a two-dimensional array of pixel-sized mirrors. The mirrors form and project an image by selectively aiming light flux output from the selected LED into or away from an optics system 1520 on a pixel-by-pixel basis. The optics system 1520 is also a component of the HUD system 1500 and is optically coupled to the LED array 1405 via the DMD 1510. The optics system 1520 projects the image formed by the DMD 1510 onto a windshield 1530.

Apparatus, systems and methods described herein may be useful in applications other than dimming light flux from LED arrays in high contrast ratio ambient light conditions.

Examples of the methods 1000 and 1200 and apparatus 1400 for controlling levels of luminance produced by an LED array and the HUD system 1500 are intended to provide a general understanding of the sequences of various methods and the structures of various embodiments. They are not intended to serve as complete descriptions of all elements and features of methods, apparatus and systems that might make use of these example sequences and structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), motor vehicles, medical devices (e.g., heart monitor, blood pressure monitor, etc.), set top boxes, and others.

Apparatus and methods disclosed herein provide color LED array dimming capabilities applicable to operation in an extremely wide dynamic range of ambient light conditions. Light flux levels sensed from a color LED array are fed back to control both current availability to the LED array and to disable/re-enable a current bypass switch to quickly shunt stored-energy current to or away from a selected LED.

In CM operation, a single flux pulse is created for the duration of the bit-slice period. Feedback from the light flux sensor is used to pulse current to an energy storage device used to supply current to the selected LED such as to maintain the output light flux at a predetermined level or set-point during the bit-slice period. A particular dimming level is achieved by establishing both the bit-slice period length and the flux magnitude set-point.

In DM operation, one or more short flux pulses are created during the bit-slice period. Both the turn-on and the turn-off time of each such DM flux pulse are controlled by alternately removing and then re-establishing a current shunt from the energy storage device to ground. Flux pulse magnitude is controlled by recognizing when the sensed flux pulse magnitude has reached a predetermined set-point. The resulting flux compare signal is used to re-establish the current shunt and to thus abruptly turn off current to the selected LED. A flux pulse of precise amplitude with a sharply falling edge results. Unexpectedly high dimming ratios on the order of 1:4000 or more are achievable in DM operation.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense.

The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An apparatus for controlling a level of luminance produced by a color light-emitting diode (LED) array, comprising:
    a parallel array of LEDs consisting of at least one LED corresponding to each of three primary colors;
    a light flux sensor flux-coupled to the LED array to sense a magnitude of light flux output from a selected LED;
    a pulse width modulation (PWM) selector communicatively coupled to the LED array to select a predetermined light flux magnitude set-point signal associated with a predetermined primary color for a predetermined flux bit-slice period;
    a flux comparator coupled to the PWM selector and to the light flux sensor to compare the sensed magnitude of light flux output to the light flux magnitude set-point signal; and
    a current drive circuit communicatively coupled to the flux comparator to selectively charge an energy storage device used to supply current to the LED array when the sensed magnitude of light flux output is less than the light flux magnitude set-point, the energy storage device coupled between the current drive circuit and a common anode terminal of the LED array.

2. The apparatus for controlling the level of luminance produced by the color light-emitting diode (LED) array of claim 1, further comprising:
    a primary color pass transistor coupled in series with each primary color LED, each pass transistor capable of being enabled using a primary color enable signal to select an associated primary color LED;
    a current bypass switch coupled between an output of the energy storage device and a resistor to ground to provide fast LED turn-on and turn-off times by selectively shunting current away from the LED array;
    a current control logic module coupled to the current drive circuit to enable the current drive circuit during the bit-slice period when the sensed magnitude of light flux output is less than the light flux magnitude set-point and no over-current condition exists; and
    a current comparator coupled to the current control logic module to compare a magnitude of current flowing through the selected primary color LED to a predetermined maximum LED current threshold signal and to toggle the current control logic such as to maintain the magnitude of current flowing through the selected primary color LED at or below the predetermined maximum LED current threshold value.

3. The apparatus for controlling the level of luminance produced by the color light-emitting diode (LED) array of claim 2, further comprising:
    a continuous mode (CM) logic module communicatively coupled to the current control logic module to provide a drive enable signal for precise turn-on and turn-off of the selected LED and to provide a shunt enable signal to control the current bypass switch; and
    a master control logic module coupled to the CM logic module to initiate a sequence of flux bit slices and to generate a set of primary color enable signals.

4. The apparatus for controlling the level of luminance produced by the color light-emitting diode (LED) array of claim 1, further comprising:
    a PWM logic module coupled to the PWM selector to generate the predetermined light flux magnitude set-point signal associated with the predetermined primary color for the predetermined flux bit-slice period and to generate the predetermined maximum LED current threshold signal;
    an LED aging compensation logic module coupled to the PWM logic module to adjust the predetermined light flux magnitude set-point over the life of the selected LED as the selected LED ages as a function of an anode-to-cathode voltage drop across the selected LED for a given current flowing through the selected LED;
    a high-side voltage analog-to-digital converter (ADC) coupled to the LED aging compensation logic module to convert a sensed anode voltage of the selected LED; and
    a low-side voltage and current ADC coupled to the LED aging compensation logic to convert a sensed cathode voltage of the selected LED.

5. An apparatus for controlling a level of luminance produced by a color light-emitting diode (LED) array, comprising:
    a parallel array of LEDs consisting of at least one LED corresponding to each of three primary colors;
    a light flux sensor flux-coupled to the LED array to sense a magnitude of light flux output from a selected LED;
    a pulse width modulation (PWM) selector communicatively coupled to the LED array to selected a predetermined light flux magnitude set-point signal associated with a predetermined primary color for a predetermined number of light flux pulses to be generated during a bit-slice period;
    a flux comparator coupled to the PWM selector and to the light flux sensor to compare the sensed magnitude of light flux output to the light flux magnitude set-point signal; and
    a current bypass switch coupled between an output of an energy storage device used to supply current to the selected LED and a resistor to ground, the current bypass switch to be disabled to initiate a ramp-up of LED forward voltage in order to create a leading edge of a light flux pulse and to be enabled to shunt current away from the selected LED in order to terminate the light flux pulse when the sensed magnitude of light flux output is equal to or greater than the light flux magnitude set-point.

6. The apparatus for controlling the level of luminance produced by the color light-emitting diode (LED) array of claim 5, further comprising:
a primary color pass transistor coupled in series with each primary color LED, each pass transistor capable of being enabled using a primary color enable signal to select an associated primary color LED;
a current comparator communicatively coupled to the LED array to compare a magnitude of current flowing through the energy storage device to a predetermined magnitude of current to be regulated through the energy storage device;
a current drive circuit communicatively coupled to the energy storage device to selectively charge the energy storage device; and
a current control logic module coupled between the current comparator and the current drive circuit to enable the current drive circuit when the magnitude of current flowing through the energy storage device is less than the predetermined magnitude of current to be regulated through the energy storage device.

7. The apparatus for controlling the level of luminance produced by the color light-emitting diode (LED) array of claim 5, further comprising:
a discontinuous mode (DM) logic module communicatively coupled to the current bypass switch to selectively enable and disable the current bypass switch to control the width of each light flux pulse; and
a master control logic module coupled to the DM logic module to establish DM operation when large dimming ratios are desirable due to low ambient light levels, to initiate a sequence of flux bit slices and to sequence a set of primary color enable signals used to select the predetermined light flux magnitude set-point signal associated with the predetermined primary color for the predetermined number of light flux pulses.

8. The apparatus for controlling the level of luminance produced by the color light-emitting diode (LED) array of claim 5, further comprising:
a PWM logic module coupled to the PWM selector to generate the predetermined light flux magnitude set-point signal associated with the predetermined primary color for the predetermined number of light flux pulses to be generated during the bit-slice period and to generate a signal representing the predetermined magnitude of current to be regulated through the energy storage device;
an LED aging compensation logic module coupled to the PWM logic module to adjust the predetermined light flux magnitude set-point over the life of the selected LED as the selected LED ages as a function of an anode-to-cathode voltage drop across the selected LED for a given current flowing through the selected LED;
a high-side voltage analog-to-digital converter (ADC) coupled to the LED aging compensation logic module to convert a sensed anode voltage of the selected LED; and
a low-side voltage and current ADC coupled to the LED aging compensation logic to convert a sensed cathode voltage of the selected LED.

9. A head-up display (HUD) system for projecting images on a windshield, comprising:
a parallel array of LEDs consisting of at least one LED corresponding to each of three primary colors;
a light flux sensor flux-coupled to the LED array to sense a magnitude of a light flux output from a selected LED;
a pulse width modulation (PWM) selector communicatively coupled to the LED array to select a predetermined light flux magnitude set-point signal associated with a predetermined primary color for a predetermined flux bit-slice period during a continuous mode (CM) of operation and to select the predetermined light flux magnitude set-point signal associated with the predetermined primary color for a predetermined number of light flux pulses to be generated during the selected bit-slice period during a discontinuous mode (DM) of operation;
a flux comparator coupled to the PWM selector and to the light flux sensor to compare the sensed magnitude of light flux output to the light flux magnitude set-point;
a current drive circuit communicatively coupled to the flux comparator to selectively charge an energy storage device used to supply current to the LED array, the energy storage device coupled between the current drive circuit and a common anode terminal of the LED array;
a current bypass switch coupled between an output of the energy storage device and a resistor to ground, during DM operation the current bypass switch to be disabled to initiate a ramp-up of LED forward voltage in order to create a leading edge of a light flux pulse and to be enabled to shunt current away from the selected LED in order to terminate the light flux pulse when the sensed magnitude of light flux output is equal to or greater than the light flux magnitude set-point;
an optics system to project an image onto a windshield; and
a digital micro-mirror device (DMD) consisting of an two-dimensional array of pixel-sized mirrors, the DMD to form and project the image by selectively aiming the light flux output from the selected LED into the optics system or away from the optics system on a pixel-by-pixel basis.

10. The HUD system of claim 9, further comprising:
a primary color pass transistor coupled in series with each primary color LED, each pass transistor capable of being enabled using a primary color enable signal to select an associated primary color LED;
a current comparator communicatively coupled to the LED array to compare a magnitude of current flowing through the energy storage device to a predetermined magnitude of current to be regulated through the energy storage device; and
a current control logic module coupled between the current comparator and the current drive circuit to enable the current drive circuit when the magnitude of current flowing through the energy storage device is less than the predetermined magnitude of current to be regulated through the energy storage device.

11. The HUD system of claim 10, further comprising:
a CM logic module communicatively coupled to the current control logic module to operate during CM mode to provide a drive enable signal for precise turn-on and turn-off of the selected LED and to provide a shunt enable signal to control the current bypass switch;
a DM logic module communicatively coupled to the current bypass switch to operate during DM mode to selectively enable and disable the current bypass switch to control the width of each light flux pulse; and a master control logic module coupled to the CM and DM logic modules to establish CM operation when small dimming ratios are desirable due to high ambient light levels and to establish DM operation when large dimming ratios are desirable due to low ambient light levels, to initiate a sequence of flux bit slices and to sequence a set of primary color enable signals used to select the predetermined light flux magnitude set-point signal associated with the predetermined primary color for a predetermined bit-slice period.

12. The HUD system of claim 10, further comprising:
a PWM logic module coupled to the PWM selector to generate the predetermined light flux magnitude set-point signal associated with the predetermined primary color for the predetermined flux bit-slice period and to generate a signal representing the predetermined magnitude of current to be regulated through the energy storage device;
an LED aging compensation logic module coupled to the PWM logic module to adjust the predetermined light flux magnitude set-point over the life of the selected LED as the selected LED ages as a function of an anode-to-cathode voltage drop across the selected LED for a given current flowing through the selected LED;
a high-side voltage analog-to-digital converter (ADC) coupled to the LED aging compensation logic module to convert a sensed anode voltage of the selected LED; and
a low-side voltage and current ADC coupled to the LED aging compensation logic to convert a sensed cathode voltage of the selected LED.

\* \* \* \* \*